United States Patent
Sweeney et al.

(10) Patent No.: US 9,853,325 B2
(45) Date of Patent: Dec. 26, 2017

(54) RUGGED, GEL-FREE, LITHIUM-FREE, HIGH ENERGY DENSITY SOLID-STATE ELECTROCHEMICAL ENERGY STORAGE DEVICES

(71) Applicant: Space Charge, LLC, Aspen, CO (US)

(72) Inventors: Daniel C. Sweeney, San Diego, CA (US); John B. Read, San Diego, CA (US)

(73) Assignee: Space Charge, LLC, Aspen, CO (US)

( * ) Notice: Subject to any disclaimer, the term of this patent is extended or adjusted under 35 U.S.C. 154(b) by 0 days.

(21) Appl. No.: 15/279,254

(22) Filed: Sep. 28, 2016

(65) Prior Publication Data

US 2017/0069932 A1  Mar. 9, 2017

Related U.S. Application Data

(63) Continuation-in-part of application No. 13/536,029, filed on Jun. 28, 2012, now abandoned.
(Continued)

(51) Int. Cl.
*H01M 10/0562* (2010.01)
*H01M 4/04* (2006.01)
(Continued)

(52) U.S. Cl.
CPC ........ *H01M 10/0562* (2013.01); *H01G 9/155* (2013.01); *H01G 11/04* (2013.01);
(Continued)

(58) Field of Classification Search
CPC .......... H01M 10/0562; H01M 4/0404; H01M 4/0426; H01M 4/0428; H01M 4/0471;
(Continued)

(56) References Cited

U.S. PATENT DOCUMENTS 3,419,487 A    12/1968 Robbins et al.
4,207,119 A    6/1980 Tyan
(Continued)

FOREIGN PATENT DOCUMENTS

DE    19948742 C1    12/2000
EP    0 078 404 A2    5/1983
(Continued)

OTHER PUBLICATIONS

Adelkhani et al. "Characterization of manganese dioxide electrodeposited by pulse and direct current for electrochemical capacitor"; Journal of Alloys and Compounds 493 (2010), pp. 175-178; available online Dec. 16, 2009.*
(Continued)

*Primary Examiner* — Gregg Cantelmo
(74) *Attorney, Agent, or Firm* — Kilpatrick Townsend & Stockton LLP

(57) ABSTRACT

Described are solid-state electrochemical energy storage devices and methods of making solid-state electrochemical energy storage devices in which components of the batteries are truly solid-state and do not comprise a gel. Nor do they rely on lithium-containing electrolytes. Electrolytes useful with the solid-state electrochemical energy storage described herein include, for example, ceramic electrolytes exhibiting a crystal structure including voids or crystallographic defects that permit conduction or migration of oxygen ions across a layer of the ceramic electrolyte. Disclosed methods of making solid-state electrochemical energy storage devices include multi-stage deposition processes, in which an electrode is deposited in a first stage and an electrolyte is deposited in a second stage.

20 Claims, 10 Drawing Sheets

Related U.S. Application Data

(60) Provisional application No. 61/502,797, filed on Jun. 29, 2011, provisional application No. 62/233,785, filed on Sep. 28, 2015.

(51) Int. Cl.

| | | |
|---|---|---|
| *H01M 4/131* | (2010.01) | |
| *H01M 4/48* | (2010.01) | |
| *H01M 4/52* | (2010.01) | |
| *H01M 4/525* | (2010.01) | |
| *H01M 4/86* | (2006.01) | |
| *H01M 4/88* | (2006.01) | |
| *H01M 8/12* | (2016.01) | |
| *H01M 10/0585* | (2010.01) | |
| *H01G 9/15* | (2006.01) | |
| *H01G 11/04* | (2013.01) | |
| *H01G 11/46* | (2013.01) | |
| *H01G 11/56* | (2013.01) | |
| *H01M 8/1253* | (2016.01) | |
| *H01M 8/126* | (2016.01) | |
| *H01M 8/1246* | (2016.01) | |
| *H01G 9/00* | (2006.01) | |
| *H01M 8/124* | (2016.01) | |

(52) U.S. Cl.
CPC ............ *H01G 11/46* (2013.01); *H01G 11/56* (2013.01); *H01M 4/0404* (2013.01); *H01M 4/0426* (2013.01); *H01M 4/0428* (2013.01); *H01M 4/0471* (2013.01); *H01M 4/131* (2013.01); *H01M 4/483* (2013.01); *H01M 4/521* (2013.01); *H01M 4/525* (2013.01); *H01M 4/8657* (2013.01); *H01M 4/88* (2013.01); *H01M 8/126* (2013.01); *H01M 8/1246* (2013.01); *H01M 8/1253* (2013.01); *H01M 10/0585* (2013.01); *H01M 2008/1293* (2013.01); *H01M 2300/0077* (2013.01); *Y02E 60/13* (2013.01)

(58) Field of Classification Search
CPC ...... H01M 4/131; H01M 4/483; H01M 4/521; H01M 4/525; H01M 4/8657; H01M 4/88; H01M 8/1246; H01M 8/1253; H01M 8/126; H01M 10/0585; H01M 2008/1293; H01M 2300/0077; H01G 9/155; H01G 11/04; H01G 11/46; H01G 11/56; Y02E 60/13

See application file for complete search history.

(56) References Cited

U.S. PATENT DOCUMENTS

| | | |
|---|---|---|
| 4,299,890 A | 11/1981 | Rea et al. |
| 4,328,262 A | 5/1982 | Kurahashi et al. |
| 4,333,808 A | 6/1982 | Bhattacharyya et al. |
| 4,353,160 A | 10/1982 | Armini et al. |
| 4,365,107 A | 12/1982 | Yamauchi |
| 4,435,445 A | 3/1984 | Allred et al. |
| 4,440,108 A | 4/1984 | Little et al. |
| 4,481,265 A | 11/1984 | Ezawa et al. |
| 4,520,039 A | 5/1985 | Ovshinsky |
| 4,539,660 A | 9/1985 | Miyauchi et al. |
| 4,633,129 A | 12/1986 | Cuomo et al. |
| 4,645,726 A | 2/1987 | Hiratani et al. |
| 4,684,848 A | 8/1987 | Kaufman et al. |
| 4,696,671 A | 9/1987 | Epstein et al. |
| 4,730,383 A | 3/1988 | Balkanski |
| 4,740,431 A | 4/1988 | Little |
| 4,756,984 A | 7/1988 | Descroix et al. |
| 4,832,463 A | 5/1989 | Goldner et al. |
| 4,862,032 A | 8/1989 | Kaufman et al. |
| 4,952,467 A | 8/1990 | Buchel et al. |
| 5,017,550 A | 5/1991 | Shioya et al. |
| 5,022,930 A | 6/1991 | Ackerman et al. |
| 5,051,274 A | 9/1991 | Goldner et al. |
| 5,061,581 A | 10/1991 | Narang et al. |
| 5,064,520 A | 11/1991 | Miyake et al. |
| 5,089,104 A | 2/1992 | Kanda et al. |
| 5,098,737 A | 3/1992 | Collins et al. |
| 5,115,378 A | 5/1992 | Tsuchiya et al. |
| 5,126,031 A | 6/1992 | Gordon et al. |
| 5,151,848 A | 9/1992 | Finello |
| 5,166,009 A | 11/1992 | Abraham et al. |
| 5,171,413 A | 12/1992 | Arntz et al. |
| 5,180,645 A | 1/1993 | More |
| 5,189,550 A | 2/1993 | Goldner et al. |
| 5,192,947 A | 3/1993 | Neustein |
| 5,202,196 A | 4/1993 | Wang et al. |
| 5,202,201 A | 4/1993 | Meunier et al. |
| 5,261,968 A | 11/1993 | Jordan |
| 5,273,837 A | 12/1993 | Aitken et al. |
| 5,296,122 A | 3/1994 | Katsube et al. |
| 5,314,765 A | 5/1994 | Bates |
| 5,338,625 A | 8/1994 | Bates et al. |
| 5,348,703 A | 9/1994 | Bishop et al. |
| 5,393,572 A | 2/1995 | Dearnaley |
| 5,411,592 A | 5/1995 | Ovshinsky et al. |
| 5,414,025 A | 5/1995 | Allcock et al. |
| 5,415,717 A | 5/1995 | Perneborn |
| 5,425,966 A | 6/1995 | Winter et al. |
| 5,426,005 A | 6/1995 | Eschbach |
| 5,426,561 A | 6/1995 | Yen et al. |
| 5,433,096 A | 7/1995 | Janssen et al. |
| 5,445,126 A | 8/1995 | Graves, Jr. |
| 5,445,906 A | 8/1995 | Hobson et al. |
| 5,448,110 A | 9/1995 | Tuttle et al. |
| 5,449,994 A | 9/1995 | Armand et al. |
| 5,455,126 A | 10/1995 | Bates et al. |
| 5,468,521 A | 11/1995 | Kanai et al. |
| 5,482,611 A | 1/1996 | Helmer et al. |
| 5,494,762 A | 2/1996 | Isoyama et al. |
| 5,501,175 A | 3/1996 | Tanaka et al. |
| 5,501,924 A | 3/1996 | Swierbut et al. |
| 5,503,948 A | 4/1996 | MacKay et al. |
| 5,510,209 A | 4/1996 | Abraham et al. |
| 5,512,147 A | 4/1996 | Bates et al. |
| 5,523,179 A | 6/1996 | Chu |
| 5,528,222 A | 6/1996 | Moskowitz et al. |
| 5,529,671 A | 6/1996 | Debley et al. |
| 5,536,333 A | 7/1996 | Foote et al. |
| 5,549,989 A | 8/1996 | Anani |
| 5,558,953 A | 9/1996 | Matsui et al. |
| 5,561,004 A | 10/1996 | Bates et al. |
| 5,567,210 A | 10/1996 | Bates et al. |
| 5,569,520 A | 10/1996 | Bates |
| 5,569,564 A | 10/1996 | Swierbut et al. |
| 5,571,749 A | 11/1996 | Matsuda et al. |
| 5,582,623 A | 12/1996 | Chu |
| 5,585,999 A | 12/1996 | De Long et al. |
| 5,593,551 A | 1/1997 | Lai |
| 5,597,660 A | 1/1997 | Bates et al. |
| 5,599,644 A | 2/1997 | Swierbut et al. |
| 5,601,652 A | 2/1997 | Mullin et al. |
| 5,612,152 A | 3/1997 | Bates et al. |
| 5,626,976 A | 5/1997 | Blanton et al. |
| 5,644,207 A | 7/1997 | Lew et al. |
| 5,648,187 A | 7/1997 | Skotheim |
| 5,654,084 A | 8/1997 | Egert |
| 5,654,111 A | 8/1997 | Minomiya et al. |
| 5,686,201 A | 11/1997 | Chu |
| 5,695,873 A | 12/1997 | Kumar et al. |
| 5,695,885 A | 12/1997 | Malhi |
| 5,705,293 A | 1/1998 | Hobson |
| 5,714,404 A | 2/1998 | Mitlitsky et al. |
| 5,763,058 A | 6/1998 | Isen et al. |
| 5,768,090 A * | 6/1998 | Li ................. H01G 9/155 29/25.03 |
| 5,789,108 A | 8/1998 | Chu |
| 5,814,420 A | 9/1998 | Chu |
| 5,830,331 A | 11/1998 | Kim et al. |

(56) References Cited

U.S. PATENT DOCUMENTS

| | | |
|---|---|---|
| 5,849,426 A | 12/1998 | Thomas et al. |
| 5,853,916 A | 12/1998 | Venugopal et al. |
| 5,863,337 A | 1/1999 | Neuman et al. |
| 5,868,914 A | 2/1999 | Landsbergen et al. |
| 5,872,080 A | 2/1999 | Arendt et al. |
| 5,914,507 A | 6/1999 | Polla et al. |
| 5,925,483 A | 7/1999 | Kejha et al. |
| 5,932,284 A | 8/1999 | Reynolds |
| 5,935,727 A | 8/1999 | Chiao |
| 5,953,677 A | 9/1999 | Sato |
| 5,978,207 A | 11/1999 | Anderson et al. |
| 5,981,107 A | 11/1999 | Hamano et al. |
| 5,982,284 A | 11/1999 | Baldwin et al. |
| 5,985,485 A | 11/1999 | Ovshinsky et al. |
| 5,995,006 A | 11/1999 | Walsh |
| 6,001,715 A | 12/1999 | Manka et al. |
| 6,002,208 A | 12/1999 | Maishev et al. |
| 6,017,651 A | 1/2000 | Nimon et al. |
| 6,023,610 A | 2/2000 | Wood, Jr. |
| 6,025,094 A | 2/2000 | Visco et al. |
| 6,033,471 A | 3/2000 | Nakanishi et al. |
| 6,037,717 A | 3/2000 | Maishev et al. |
| 6,042,687 A | 3/2000 | Singh et al. |
| 6,056,857 A | 5/2000 | Hunt et al. |
| 6,059,847 A | 5/2000 | Farahmandi et al. |
| 6,077,621 A | 6/2000 | Allen et al. |
| 6,078,791 A | 6/2000 | Tuttle et al. |
| 6,086,962 A | 7/2000 | Mahoney et al. |
| 6,094,292 A | 7/2000 | Goldner et al. |
| 6,103,412 A | 8/2000 | Hirano et al. |
| 6,108,191 A * | 8/2000 | Bruchhaus ............ H01G 4/306 257/295 |
| 6,110,620 A | 8/2000 | Singh et al. |
| 6,130,507 A | 10/2000 | Maishev et al. |
| 6,133,159 A | 10/2000 | Vaartstra et al. |
| 6,136,165 A | 10/2000 | Moslehi |
| 6,139,964 A | 10/2000 | Sathrum et al. |
| 6,147,354 A | 11/2000 | Maishev et al. |
| 6,153,067 A | 11/2000 | Maishev et al. |
| 6,163,260 A | 12/2000 | Conwell et al. |
| 6,165,644 A | 12/2000 | Nimon et al. |
| 6,168,884 B1 | 1/2001 | Neudecker et al. |
| 6,181,237 B1 | 1/2001 | Gehlot |
| 6,181,545 B1 | 1/2001 | Amatucci et al. |
| 6,203,944 B1 | 3/2001 | Turner et al. |
| 6,220,516 B1 | 4/2001 | Tuttle et al. |
| 6,222,117 B1 | 4/2001 | Shiozaki |
| 6,236,061 B1 | 5/2001 | Walpita |
| 6,238,813 B1 | 5/2001 | Maile et al. |
| 6,264,709 B1 | 7/2001 | Yoon et al. |
| 6,277,523 B1 | 8/2001 | Giron |
| 6,280,875 B1 | 8/2001 | Kwak et al. |
| 6,281,795 B1 | 8/2001 | Smith et al. |
| 6,294,722 B1 | 9/2001 | Kondo et al. |
| 6,325,294 B2 | 12/2001 | Tuttle et al. |
| 6,327,909 B1 | 12/2001 | Hung et al. |
| 6,391,664 B1 | 5/2002 | Goruganthu et al. |
| 6,399,489 B1 | 6/2002 | M'Saad et al. |
| 6,402,795 B1 | 6/2002 | Chu et al. |
| 6,402,796 B1 | 6/2002 | Johnson |
| 6,413,285 B1 | 7/2002 | Chu et al. |
| 6,413,675 B1 | 7/2002 | Harada et al. |
| 6,432,577 B1 | 8/2002 | Shul et al. |
| 6,475,854 B2 | 11/2002 | Narwankar et al. |
| 6,548,424 B2 * | 4/2003 | Putkonen ............ C23C 16/405 257/E21.274 |
| 6,558,836 B1 | 5/2003 | Whitacre et al. |
| 6,576,365 B1 | 6/2003 | Meitav et al. |
| 6,576,369 B1 | 6/2003 | Moriguchi et al. |
| 6,576,371 B1 | 6/2003 | Yasuda |
| 6,599,580 B2 | 7/2003 | Muffoletto et al. |
| 6,608,464 B1 | 8/2003 | Lew et al. |
| 6,610,971 B1 | 8/2003 | Crabtree |
| 6,634,232 B1 | 10/2003 | Rettig et al. |
| 6,645,656 B1 | 11/2003 | Chen et al. |
| 6,723,140 B2 | 4/2004 | Chu et al. |
| 6,741,178 B1 | 5/2004 | Tuttle |
| 6,749,648 B1 | 6/2004 | Kumar et al. |
| 6,770,176 B2 | 8/2004 | Benson et al. |
| 6,805,998 B2 | 10/2004 | Jenson et al. |
| 6,818,356 B1 | 11/2004 | Bates |
| 6,821,348 B2 | 11/2004 | Baude et al. |
| 6,866,901 B2 | 3/2005 | Burrows et al. |
| 6,897,164 B2 | 5/2005 | Baude et al. |
| 6,906,436 B2 | 6/2005 | Jenson et al. |
| 6,924,164 B2 | 8/2005 | Jenson |
| 6,955,866 B2 | 10/2005 | Nimon et al. |
| 6,982,132 B1 | 1/2006 | Goldner et al. |
| 6,986,965 B2 | 1/2006 | Jenson et al. |
| 6,989,750 B2 | 1/2006 | Shanks et al. |
| 6,991,662 B2 | 1/2006 | Visco et al. |
| 7,052,805 B2 | 5/2006 | Narang et al. |
| 7,169,503 B2 | 1/2007 | Laurent et al. |
| 7,220,517 B2 | 5/2007 | Park et al. |
| 7,267,897 B2 | 9/2007 | Bloch et al. |
| 7,282,296 B2 | 10/2007 | Visco et al. |
| 7,776,478 B2 | 8/2010 | Klaassen |
| 2001/0007335 A1 | 7/2001 | Tuttle et al. |
| 2001/0014398 A1 | 8/2001 | Veerasamy |
| 2001/0033952 A1 | 10/2001 | Jenson et al. |
| 2001/0041294 A1 | 11/2001 | Chu et al. |
| 2001/0043569 A1 | 11/2001 | Wood, Jr. |
| 2001/0051300 A1 | 12/2001 | Moriguchi et al. |
| 2002/0000034 A1 | 1/2002 | Jenson |
| 2002/0025458 A1 | 2/2002 | Faville et al. |
| 2002/0037756 A1 | 3/2002 | Jacobs et al. |
| 2002/0076616 A1 | 6/2002 | Lee et al. |
| 2002/0110733 A1 | 8/2002 | Johnson |
| 2002/0110739 A1 | 8/2002 | McEwen et al. |
| 2003/0008364 A1 | 1/2003 | Wang et al. |
| 2003/0013012 A1 | 1/2003 | Ahn et al. |
| 2003/0104590 A1 | 6/2003 | John et al. |
| 2003/0151118 A1 | 8/2003 | Baude et al. |
| 2003/0171984 A1 | 9/2003 | Wodka et al. |
| 2003/0175585 A1 | 9/2003 | Ugaji et al. |
| 2004/0023106 A1 | 2/2004 | Benson et al. |
| 2004/0043290 A1 | 3/2004 | Hatta et al. |
| 2004/0049909 A1 | 3/2004 | Salot et al. |
| 2004/0067396 A1 | 4/2004 | Bloch et al. |
| 2004/0077383 A1 | 4/2004 | Lappetelainen et al. |
| 2004/0086781 A1 | 5/2004 | Fukuzawa et al. |
| 2004/0094949 A1 | 5/2004 | Savagian et al. |
| 2004/0131760 A1 | 7/2004 | Shakespeare |
| 2004/0131761 A1 | 7/2004 | Shakespeare |
| 2004/0131897 A1 | 7/2004 | Jensen et al. |
| 2004/0151985 A1 | 8/2004 | Munshi |
| 2004/0161640 A1 | 8/2004 | Salot |
| 2004/0219434 A1 | 11/2004 | Benson et al. |
| 2005/0001214 A1 | 1/2005 | Brun et al. |
| 2005/0019635 A1 | 1/2005 | Arroyo et al. |
| 2005/0019666 A1 | 1/2005 | Yasuda |
| 2005/0042499 A1 | 2/2005 | Laurent et al. |
| 2005/0079418 A1 | 4/2005 | Kelley et al. |
| 2005/0095506 A1 | 5/2005 | Klaassen |
| 2005/0199282 A1 | 9/2005 | Oleinick et al. |
| 2006/0022829 A1 | 2/2006 | Pan |
| 2006/0154141 A1 | 7/2006 | Salot et al. |
| 2006/0191198 A1 | 8/2006 | Rosenzweig et al. |
| 2007/0012244 A1 | 1/2007 | Klaassen |
| 2007/0015060 A1 | 1/2007 | Klaassen |
| 2007/0037059 A1 | 2/2007 | Salot et al. |
| 2007/0048604 A1 | 3/2007 | Gaillard et al. |
| 2007/0067984 A1 | 3/2007 | Gaillard et al. |
| 2007/0238019 A1 | 10/2007 | Laurent et al. |
| 2009/0169942 A1 | 7/2009 | Hertz et al. |
| 2010/0301734 A1 | 12/2010 | Suh et al. |
| 2013/0170097 A1 * | 7/2013 | Sweeney ............ H01G 9/155 361/502 |

(56) References Cited

U.S. PATENT DOCUMENTS

2013/0302965 A1* 11/2013 Summerfelt ........ H01L 23/5223
438/382

FOREIGN PATENT DOCUMENTS

| | | |
|---|---|---|
| EP | 0 410 627 A1 | 1/1991 |
| EP | 0 414 902 A1 | 3/1991 |
| EP | 0 643 544 A1 | 3/1995 |
| EP | 0 691 697 A1 | 1/1996 |
| EP | 0 860 888 A1 | 1/1996 |
| EP | 0867752 A1 | 9/1998 |
| EP | 1 041 657 A2 | 10/2000 |
| EP | 1 675 207 A1 | 6/2006 |
| GB | 2 318 127 A | 4/1998 |
| JP | 58126679 | 7/1983 |
| JP | 59123236 | 7/1984 |
| JP | 60012679 | 1/1985 |
| JP | 6244960 | 2/1987 |
| JP | 62044960 | 2/1987 |
| JP | 63166151 | 1/1990 |
| JP | 6067018 | 3/1994 |
| JP | 6111828 | 4/1994 |
| JP | 6196178 | 7/1994 |
| JP | 6223805 | 8/1994 |
| JP | 07006933 | 1/1995 |
| JP | 07050229 | 2/1995 |
| JP | 07057739 | 3/1995 |
| JP | 0817179 | 1/1996 |
| JP | 8293310 | 5/1996 |
| JP | 8236105 | 9/1996 |
| JP | 8287901 | 11/1996 |
| JP | 8329983 A2 | 12/1996 |
| JP | 09035233 | 2/1997 |
| JP | 09211204 | 8/1997 |
| JP | 10021896 | 1/1998 |
| JP | 10021933 | 1/1998 |
| JP | 11186087 A * | 7/1999 |
| JP | 2000188113 A | 7/2000 |
| JP | 3205757 B2 | 4/2001 |
| JP | 3262697 B2 | 3/2002 |
| JP | 2013145899 A * | 7/2013 |
| WO | 92/15140 A1 | 9/1992 |
| WO | 92/16025 A1 | 9/1992 |
| WO | 92/19090 A1 | 10/1992 |
| WO | 93/14612 A1 | 7/1993 |
| WO | 95/14311 A1 | 5/1995 |
| WO | WO 9617361 A1 * | 6/1996 ............ H01G 9/155 |
| WO | 97/38453 A1 | 10/1997 |
| WO | 97/39491 A1 | 10/1997 |
| WO | 98/13743 A1 | 4/1998 |
| WO | 98/47196 A1 | 10/1998 |
| WO | 99/25908 A1 | 5/1999 |
| WO | 99/33124 A1 | 7/1999 |
| WO | 02/39205 A2 | 5/2002 |
| WO | 02/47508 A2 | 6/2002 |
| WO | 07/011898 A2 | 1/2007 |
| WO | 07/011899 A2 | 1/2007 |
| WO | 07/011900 A1 | 1/2007 |
| WO | 2013/154623 A1 | 10/2013 |
| WO | 2017/058963 A1 | 4/2017 |

OTHER PUBLICATIONS

Osada et al. "Robust High-K Response in Molecularly Thin Film Perovskite Nanosheets"; www.acsnano.org, vol. 4, No. 9, (2010), pp. 5225-5232; published online Aug. 24, 2010.*

Zhang et al. "Manganese oxide-carbon composite as supercapacitor electrode materials"; Microporous and Mesoporous Materials 123 (2009), pp. 260-267, available online Apr. 8, 2009.*

Zhu et al.; "Dielectric properties of YSZ high-k thin films fabricated at low temperature by pulsed laser deposition"; Materials Letters 57 (2003); pp. 4297-4301.*

International Search Report and Written Opinion for PCT/US2016/054255 dated Jan. 26, 2017, 15 pages.

Article 34 Response and Chapter 2 Demand for PCT/US2016/054255 filed Jul. 28, 2017, 36 pages.

Adler, Stuart, "Factors Governing Oxygen Reduction in Solid Oxide Fuel Cell Cathodes," Chem. Rev. Oct. 13, 2004, 104, pp. 4791-4843, Department of Chemical Engineering, University of Washington, Seattle, WA.

Azad, et al., "Nanoscale effects on ion conductance of layer-by-layer structures of gadolinia-doped ceria and zirconia," Applied Physics Letters 86, 131906 (2005); doi: 10.1063/1.1894615, 4 pages.

Beckel, et al., "Thin films for micro solid oxide fuel cells," Science Direct, Journal of Power Sources 173 (2007) pp. 325-345, Zurich, Switzerland.

Boivin, et al., "Recent Material Developments in Fast Oxide Ion Conductors," Chem. Mater. 1998, 10, pp. 2870-2888.

Chmiola, et al., "Monolithic Carbide-Derived Carbon Films for Micro-Supercapacitors," Science, vol. 328, Apr. 23, 2010, 5 pages.

Garcia-Barriocanal, et al., "Colossal Ionic Conductivity at Interfaces of Expitaxial ZrO 2:Y2O3/SrTiO3 Heterostructures," Science 321, 676 (2008) DOI: 10.1126/science.1156393, 6 pages.

Garcia-Barriocanal, et al., "Tailoring Disorder and Dimensionality: Strategies for Improved Solid Oxide Fuel Cell Electrolytes," ChemPhysChem 2009, 10, pp. 1003-1011, DOI: 10.1002/cphc.200800691.

Guo, et al., "Comprehensive Modeling of Ion Conduction of Nanosized $CaF_2/BaF_2$ Multilayer Heterostuctures," Adv. Funct. Mater. 2009, 19, pp. 96-101.

Jaccoud, et al., "Charge storage in the $O_{2(g)}$, Pt/YSZ system," Electrochimica Acta 52 (2007) pp. 7927-7935.

Jalili, et al., "New Insights into the Strain Coupling to Surface Chemistry, Electronic Structure, and Reactivity of $La_{O.7}Sr_{O.3}MnO_3$," dx.doi.org/10.1 021/jz200160b, J. Phys. Chem. Lett. 2011, 2, pp. 801-807.

Kilner, John A., "Feel the strain," Nature Materials, vol. 7, Nov. 2008, 2 pages.

Kouassi, et al., "Proton exchange membrane micro fuel cells on 3D porous silicon gas diffusion layers," Journal of Power Sources 216 (2012) pp. 15-21.

Kubicek, et al., "Tensile Lattice Strain Accelerates Oxygen Surface Exchange and Diffusion in $La_{1-x}Sr_xCoO_{3-\delta}$ Thin Films," American Chemical Society, vol. 7, No. 4, pp. 3276-3286.

Kullgren, Jolla, "Oxygen Vacancy Chemistry in Ceria," Digital Comprehensive Summaries of Uppsala Dissertations from the Faculty of Science and Technology 896, 2012, 60 pages.

Lim, et al., "Thin Film Supercapacitors Using a Sputtered $RuO_2$ Electrode," Journal of the Electrochemical Society, 148 (3) pp. A275-A278 (2001).

Nandasiri, Manjula, "Engineered Interfaces and Nano-Scale Thin Films for Solid Oxide Fuel Cell Electrolytes," (2013). Dissertations, paper 152. Western Michigan University Graduate College, 120 pages.

Pennycook, et al., "Origin of Colossal Ionic Conductivity in Oxide Multilayers: Interface Induced Sublattice Disorder," PRL 104, 115901 (2010), 4 pages.

Ramanathan, Shriram, "Interface-mediated ultrafast carrier conduction in oxide thin films and superlattices for energy," Journal of Vacuum Science & Technology A 27, 1126, 2009, 10 pages.

Rivera, et al., "Electrical conductivity relaxation in thin-film yttria-stabilized zirconia," Appl. Phys. Lett. 78, 610 (2001); doi: 10.1063/1.1343852, 4 pages.

Sata, et al., "Mesoscopic fast ion conduction in nanometer-scale planar heterostructures," Nature, vol. 408, Dec. 21-28, 2000, 4 pages.

Schichtel, et al., "Elastic strain at interfaces and its influence on ionic conductivity in nanoscaled solid electrolyte thin films—theoretical consideration and experimental studies," Physical Chemistry Chemical Physics 11(17), pp. 3043-3048, 2009.

Shim, et al., "Atomic layer deposition of yttria stabilized zirconia for solid oxide fuel cells," Chem. Mater. 2007, 19, pp. 3850-3854.

Sillassen, et al., "Low-Temperature Superionic Conductivity in Strained Yttria-Stabilized Zirconia," Advanced Functional Materials 20 (13) 2010, 6 pages.

(56) References Cited

OTHER PUBLICATIONS

Skinner, et al., "Oxygen ion conductors," Materials Today, Mar. 2003, 8 pages.

Tuller, et al., "Micro-ionics: next generation power sources," Physical Chemistry and Chemical Physics 11 (17) 2009, pp. 3023-3034.

Wang, et al., "All-Nanosheet Ultrathin Capacitors Assembled Layer-by-Layer via Solution-Based Processes," vol. 8, No. 3, 2014, pp. 2658-2666.

* cited by examiner

RUGGED, GEL-FREE, LITHIUM-FREE, HIGH ENERGY DENSITY SOLID-STATE ELECTROCHEMICAL ENERGY STORAGE DEVICES

CROSS-REFERENCE TO RELATED APPLICATIONS

This application claims the benefit of and priority to U.S. Provisional Application No. 62/233,785, filed on Sep. 28, 2015. This application is also a continuation-in-part of U.S. Application No. 13/536,029, filed on Jun. 28, 2012, now abandoned, which claims the benefit of and priority to U.S. Provisional Application No. 61/502,797, filed Jun. 29, 2011. The entire disclosures of the above applications are hereby incorporated by reference, for all purposes, as if fully set forth herein.

FIELD

The present invention relates to electrochemical energy storages device having no close precedent in the prior art and methods for making electrochemical energy storage devices. The devices diverge from the prior art in their scale, physical construction and geometry, chemistry, electrical behaviors, and applications.

CONSTRAINTS ON THE PERFORMANCE OF THE CURRENT ART

Hundreds of developed battery chemistries and architectures exist, and there is likewise an extreme diversity in terms of cycle life, storage capacity, robustness, stability, and cost. Nevertheless, certain commonalities emerge after careful consideration of the many variants.

Conventional batteries exhibit high energy densities compared to most other methods of energy storage, but perform very poorly compared to combustible sources of energy such as fossil fuels, alcohols, and hydrogen gas, all of which exceed conventional batteries by many multiples in this regard. This has important implications with regard to powered portable devices and electric traction.

Conventional batteries have low power density compared to both capacitors and high velocity flywheels. Their ability to follow fluctuating electrical loads and complex electrical impedances is therefore limited as well.

Some secondary batteries are based upon purportedly reversible electrochemical reactions, but they are not, in fact, fully reversible in any practical sense. Secondary batteries characteristically lose storage capacity over time, and exhibit degradation of their component parts as they undergo repeated charging and discharging. For example, secondary batteries may exhibit a loss in capacity due to destruction of the electrolyte, the anode, or the cathode. Overcharging and fully discharging secondary batteries may also cause capacity loss. In extreme cases, secondary batteries, such as lithium-based secondary batteries, may also exhibit a short circuit and rapidly discharge and heat and even catch fire. Additionally, exposure of many secondary batteries to elevated temperatures may also degrade various components and result in capacity loss. Thus, secondary batteries, for the most part, cannot be fully discharged without damage, degradation, and a considerable abbreviation of their useful working lives. Conversely, they cannot tolerate overcharging.

Conventional batteries are subject to electrical leakage and charge dissipation and cannot maintain a given state of charge indefinitely or even over a span of weeks. Such dissipation can eventually lead to full discharge and damage to the battery.

Conventional batteries cannot be charged instantaneously or even particularly quickly. Presenting conventional batteries with an excessive charging current in an effort to accelerate the charging process will generally damage the device. Moreover, charging with any rapidity entails a complex charging algorithm and an intelligent interface, increasing system complexity.

Conventional batteries, for the most part, are comprised of liquids and/or gels which do not lend themselves to precision manufacturing or extreme reductions in scale, and which may be subject to leakage and/or evaporation, and which require external containment vessels.

Conventional batteries do not thrive in extreme temperature environments. With the exception of the small subset of high temperature batteries, such as sodium sulfur and lithium sulfur types, almost none can endure temperatures of even a hundred degrees Celsius, while operation at zero degrees Celsius and below results in greatly diminished capacity and sluggish performance.

Conventional batteries are low voltage devices, with 4 volts representing the maximum operating potential of any established chemistry, and 2 volts or less being more representative. Such a voltage range is impractically low for many applications, and thus battery manufacturers must resort to connecting a number of individual cells in series to achieve higher voltages. Balancing such series of cells can be difficult due to normal cell-to-cell variation in electrical output. Individual cell failure can also result in lost capacity and diminished usability.

Most of the established conventional battery chemistries appear to be approaching the ends of their respective development cycles and have been subject to diminishing returns in terms of performance improvements.

Such deficiencies are attributable both to the chemistries themselves, the design and articulation of the electrodes and their interface with the electrolyte material, and with the way that traditional fabrication techniques have tended to dictate architecture.

SUMMARY

Devices for electrochemically storing energy at a high density are described. Methods of making electrochemical energy storage devices are also described. In embodiments, the electrochemical energy storage devices correspond to an all solid-state construction, and do not include any gels, liquids, or other materials that are incompatible with microfabrication techniques, such as may be used in the fabrication of integrated circuits and photovoltaic devices.

In a first aspect, an electrochemical energy storage device embodiment comprises a first electrode, a solid electrolyte positioned in direct contact with the first electrode, and a second electrode positioned in direct contact with the solid electrolyte. It will be appreciated that the first and second electrodes may be positioned such that the solid electrolyte is between the first and second electrodes.

Various aspects of the electrodes may take on different configurations, depending on the particular embodiments utilized. For example, in some embodiments, a variety of electrode thicknesses are useful with the electrochemical energy storage devices. For example, in embodiments, the first electrode and the second electrode independently have thicknesses selected between about 1 nm and about 5 nm, between about 1 nm and about 10 nm, between about 1 nm and about 15 nm, between about 1 nm and about 20 nm, between about 1 nm and about 25 nm, between about 1 nm and about 30 nm, between about 1 nm and about 35 nm, between about 1 nm and about 40 nm, between about 1 nm and about 45 nm, between about 1 nm and about 50 nm, between about 1 nm and about 55 nm, between about 1 nm and about 60 nm, between about 1 nm and about 65 nm, between about 1 nm and about 70 nm, or between about 1 nm and about 75 nm. Optionally, an electrode thickness is about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 95 nm, or about 100 nm. It will be appreciated, however, that electrodes of any thickness greater than or about 1 nm may be utilized for some embodiments.

In some embodiments, the electrodes may have independent chemical structures. For example, in some embodiments, the first electrode and the second electrode independently comprise oxides of a metal selected from the group consisting of Fe, Co, Ni, Cu, Mo, Tc, Rh, Pd, Ag, W, Re, Os, Ir, and Pt. Optionally, the first electrode and the second electrode independently comprise oxides of a metal selected from the group consisting of Mn, Fe, Co, Ni, Cu, Mo, Tc, Ru, Rh, Pd, Ag, W, Re, Os, Ir, and Pt. In some embodiments, an electrode comprises the same metal oxide as another electrode. In other embodiments, an electrode comprises a different metal oxide as another electrode.

In some embodiments, using particular metals or metal oxides for the electrodes may be advantageous, as certain metals and metal oxides may exhibit desirable properties. For example, in some embodiments, an electrode is capable of undergoing reversible redox reactions to gain or lose oxygen atoms at a respective electrode surface during charging or discharging. As another example, in some embodiments, a metal of an electrode is capable of forming sequences of metal oxides of progressively greater molecular weight at a respective electrode surface. Optionally, an electrode undergoes electrochemical oxygen adsorption during charging of the solid-state energy storage device. Optionally, an electrode undergoes electrochemical oxygen desorption during charging of the solid-state energy storage device. Optionally, a metal of an electrode exhibits a work function of between about 4 eV and about 5 eV.

In some embodiments, the oxide of the metal of an electrode is dispersed on an electrically conductive supporting matrix. For example, in embodiments, the electrically conductive supporting matrix may comprise carbon, graphite, or other materials that may provide electrical conductivity while also providing a platform for deposition of the electrode material. In embodiments, use of an electrically conductive supporting matrix may be advantageous for increasing a surface area of the metal or metal oxide of the electrode to increase the electrode mass that may take part in electrochemical redox reactions when charging and/or discharging the electrochemical storage devices.

Optionally, electrodes may be independently fabricated using a controllable deposition method. Useful deposition techniques include, but are not limited to, atomic layer deposition, magnetron sputtering, and chemical vapor deposition. Other fabrication techniques useful for fabricating the electrodes may include or involve other techniques, such as ultraviolet lithography, x-ray lithography, holographic lithography, laser ablation, and thermal evaporation.

Various aspects of the solid electrolyte may take on different configurations, depending on the particular embodiments utilized. For example, in some embodiments, a variety of electrolyte thicknesses are useful with the electrochemical energy storage devices. For example, in embodiments, an electrolyte has a thickness selected between about 1 nm and about 5 nm, between about 1 nm and about 10 nm, between about 1 nm and about 20 nm, between about 1 nm and about 50 nm, between about 1 nm and about 100 nm, between about 1 nm and about 150 nm, between about 1 nm and about 200 nm, or between about 1 nm and about 250 nm. Other electrolyte thicknesses may be useful for some embodiments, though electrolyte thicknesses less than or about 250 nm may be preferable for certain embodiments. In some embodiments, for example, an electrolyte has a thickness selected between about 1 nm and about 300 nm, between about 1 nm and about 350 nm, between about 1 nm and about 400 nm, between about 1 nm and about 450 nm, between about 1 nm and about 500 nm, between about 1 nm and about 550 nm, or between about 1 nm and about 600 nm.

As the electrolyte thickness is increased, embodiments may experience reduced device performance. For example, depending on the embodiment, an electrolyte thickness may correlate with the ionic conductivity of the electrolyte. At some particular thickness, however, the electrolyte may exhibit a dramatic decrease in ionic conductivity, making such an electrolyte unsuitable for use in an electrochemical energy storage device. For example, depending on the particular electrolyte composition used in some embodiments, the maximum useful electrolyte thickness may be about 500 nm, about 550 nm, about 600 nm, about 650 nm, or less than about 700 nm. Each particular electrolyte composition may exhibit a "cut-off" thickness value above which the electrolyte exhibits conductivity properties comparable to the bulk, such as where an ionic conductivity is unsuitable for use in an electrochemical energy storage device, and below which the electrolyte exhibits conductivity properties different from the bulk, such as where the ionic conductivity is about 10× greater or more, about 100× greater or more, about 1000× greater or more, about 10000× greater or more, or about 100000× greater or more than the ionic conductivity of the electrolyte in the bulk. In some embodiments, a solid electrolyte exhibits an oxygen ion conductivity at about 25° C. that is about 1000 times greater or more than a bulk oxygen ion conductivity for the solid electrolyte. Optionally, the bulk oxygen ion conductivity for the solid electrolyte corresponds to a conductivity of oxygen ions at about 25° C. for the solid electrolyte having a thickness greater than about 700 nm. Optionally, at about 25° C., the solid electrolyte exhibits an ion conductivity for oxygen ions selected from the range of about 0.000001 $S \cdot cm^{-1}$ to about 0.2 $S \cdot cm^{-1}$, or wherein the solid electrolyte exhibits an ion conductivity for oxygen ions in excess of about 0.00001 $S \cdot cm^{-1}$ at about 25° C.

In embodiments, various materials properties of the solid electrolyte allow for migration of ions across the solid electrolyte, making the solid electrolyte suitable for use in an electrochemical energy storage device. It will be appreciated that certain solid electrolytes may exhibit ionic conductivity properties at high temperatures, such as at temperatures of about 600° C., which would otherwise be suitable for use in an electrochemical energy storage device, except that the temperature is impractical to achieve, maintain, or use. Electrochemical energy storage devices of the invention, however, maintain suitable ionic conductivity properties even at temperatures at which conventional batteries are useful, such as about 25° C. Unlike conventional batteries, the electrochemical energy storage devices of the invention exhibit suitable properties at most temperatures commonly encountered by humans. For example, the solid-state electrolytes used in the electrochemical energy storage devices may exhibit suitable ionic properties at temperatures as low as about −50° C., as well as at temperatures as high as about 50° C. and higher.

Various compositions are useful for the solid electrolytes of the electrochemical energy storage devices. In embodiments, a solid electrolyte comprises a ceramic selected from the group consisting of a perovskite ceramic, a ceramic having a perovskite structure, a zirconium ceramic, a ceria-gadolinia ceramic, an alumina ceramic, and any combination of these. Optionally, the solid electrolyte comprises a ceramic selected from the group consisting of a perovskite ceramic, a ceramic having a perovskite structure, a zirconium-scandia ceramic, a ceria-gadolinia ceramic, an alumina ceramic, and any combination of these. Optionally, a solid electrolyte comprises a crystalline ceramic, such as a single crystalline or polycrystalline ceramic material.

Optionally, the solid electrolyte comprises a composite solid electrolyte including a plurality of different ceramics. For example the solid electrolyte may comprise layers of different ceramic materials. In embodiments, strained solid electrolytes may exhibit higher ionic conductivities than unstrained solid electrolytes and, thus, imparting strain on a solid electrolyte may provide for a way to increase the ionic conductivity of the solid electrolyte to a level suitable for use in a solid-state electrochemical energy storage device. In embodiments, introducing stress or strain into the electrolyte may result in the generation of voids or crystallographic defects. Use of composite solid electrolytes may be useful, in embodiments, to impart strain or stress on the solid electrolyte materials, as different solid electrolyte materials may exhibit different thermal expansion properties. In embodiments, the solid electrolytes may be formed at high temperatures and then allowed to relax to ambient temperature and the different expansion properties may create levels of strain that allow the solid electrolyte to possess an ionic conductivity suitable for use in an electrochemical energy storage device. The stress or strain placed on the electrolyte may, in embodiments, modify the ionic conductivity of the electrolyte to increase it to a level beyond that in the unstressed or unstrained condition. Other techniques may be useful for imparting stress or strain to an electrolyte, including exploiting different thermal expansion characteristics of non-electrolyte materials positioned proximal to, adjacent to, or in direct contact with the electrolyte.

Additionally, piezoelectric materials may optionally be positioned proximal to, adjacent to, or in direct contact with the electrolyte and exposed to a potential to cause expansion or contraction of the material to impart stress or strain on an electrolyte. In some embodiments, use of piezoelectric materials may be beneficial for controlling the amount of ionic conductivity permitted by the electrolyte. For example, an electrochemical energy storage device may include a solid electrolyte, in some embodiments, which has a relatively low ionic conductivity and a piezoelectric material that is positioned proximal the electrolyte in order to control the ionic conductivity of the electrolyte, as desired. For example, in some embodiments, the piezoelectric material may be actuated to afford an increase in the electrolyte ionic conductivity during a charging or discharging cycle, but then be de-actuated or relaxed while not charging or discharging. Such an embodiment, for example, may provide a way to prevent or reduce self-discharge of an electrochemical energy storage device while not in use or in storage.

In some embodiments, a solid electrolyte comprises or exhibits a crystal structure including voids or crystallographic defects that permit conduction or migration of ions, such as oxygen ions (e.g., oxygen anions), through the solid electrolyte at temperatures between about 0° C. and about 100° C. In some embodiments, the solid electrolyte comprises or exhibits a crystal structure including voids or crystallographic defects that permit conduction or migration of oxygen ions through the solid electrolyte at temperatures outside of the previously mentioned range, such as at temperatures less than about 0° C. or greater than about 100° C. As described above, it will be appreciated that this property may be contrasted with the same material of the solid electrolyte in the bulk, where voids crystallographic defects present in the bulk material may still not provide for suitable ionic conductivity. Optionally, the crystallographic defects correspond to one or more vacancy defects, interstitial defects, boundary defects, line defects, planar defects, bulk defects, or lattice imperfections. Optionally, a solid electrolyte comprises a doped ceramic including one or more dopants. Useful dopants include, but are not limited to, an alkali metal dopant, an alkaline earth dopant, a group 3 dopant, a scandium dopant, a yttrium dopant, a lanthanide dopant, a titanium oxide dopant, a hydrogen dopant, a silver dopant, and a lead dopant. Optionally, a solid electrolyte comprises a heavily doped ceramic, For example, in some embodiments a solid electrolyte comprises a ceramic alloy, such as beta alumina.

Optionally, solid electrolytes may be fabricated using a controllable deposition method. Useful deposition techniques include, but are not limited to, atomic layer deposition, magnetron sputtering, and chemical vapor deposition. Other fabrication techniques useful for fabricating the electrolytes may include or involve other techniques, such as ultraviolet lithography, x-ray lithography, holographic lithography, laser ablation, and thermal evaporation.

It will be appreciated that the solid electrolytes useful with the electrochemical energy storage devices disclosed herein are different from those used in conventional batteries. For example, in embodiments, the solid electrolyte is free from or does not include any liquids or gels. Additionally, the solid electrolytes are categorically different from those used with lithium-based batteries. For example, lithium-based batteries may rely on a lithium containing electrolyte. In embodiments, the solid electrolytes used with the electrochemical energy storage devices described here are free from or do not include any lithium, such as lithium atoms, lithium ions, or lithium salts.

Optionally, an electrochemical energy storage device further comprises a second solid electrolyte positioned in direct contact with the second electrode, and a third electrode positioned in direct contact with the second solid electrolyte. Optionally, an electrochemical energy storage device further comprises one or more solid electrolyte and metal oxide electrode bi-layers positioned in direct contact with a topmost electrode. It will be appreciated that the characteristics described above may also apply to additional solid electrolytes and electrodes.

In embodiments, the electrochemical energy storage devices may be charged using any suitable voltage. For example, charging voltages may be higher than used in conventional secondary batteries. For example, in embodiments, a voltage difference between the first electrode and the second electrode may be greater than about 1 V, greater than about 2 V, greater than about 4 V, greater than about 8 V, or greater than about 16 V. Other voltage differences are possible, including voltages of about 0.5 V, about 1 V, about 1.5 V, about 2 V, about 2.5 V, about 3 V, about 3.5 V, about 4 V, about 4.5 V, about 5 V, about 5.5 V, about 6 V, about 6.5

V, about 7 V, about 7.5 V, about 8 V, about 8.5 V, about 9 V, about 9.5 V, about 10 V, about 10.5 V, about 11 V, about 11.5 V, about 12 V, about 12.5 V, about 13 V, about 13.5 V, about 14 V, about 14.5 V, about 15 V, about 15.5 V, about 16 V, about 16.5 V, about 17 V, about 17.5 V, about 18 V, about 18.5 V, about 19 V, about 19.5 V, about 20 V, etc.

In embodiments, the solid-state energy storage devices may be characterized by electrical energy densities comparable to other energy storage devices, such as conventional batteries, and may even exceed the energy storage densities of conventional batteries. For example, the electrical energy density of the solid-state energy storage device may be greater than about 10 $J/cm^3$, greater than about 20 $J/cm^3$, greater than about 50 $J/cm^3$, greater than about 100 $J/cm^3$, greater than about 150 $J/cm^3$, greater than about 200 $J/cm^3$, greater than about 250 $J/cm^3$, greater than about 300 $J/cm^3$, greater than about 350 $J/cm^3$, greater than about 400 $J/cm^3$, greater than about 450 $J/cm^3$, or greater than about 500 $J/cm^3$, etc.

In contrast to conventional batteries, the disclosed energy storage devices may be included in an integrated circuit, microelectromechanical system, or other system assembled using microfabrication tools. For example, in embodiments, the first electrode, the solid-state electrolyte, and the second electrode are components of an integrated circuit. Optionally, one or more circuit elements of the integrated circuit are positioned in electrical communication with the first electrode or the second electrode such that the one or more circuit elements receive electrical energy stored by the solid-state energy storage device. It will be appreciated that electrical communication may be direct or indirect.

In addition, the disclosed electrochemical energy storage devices may be included as a component of a photovoltaic system. For example, in embodiments, the first electrode, the solid-state electrolyte, and the second electrode are integrated with a photovoltaic cell or are integrated components of a photovoltaic system. For example, in some embodiments, the first electrode, the solid-state electrolyte, and the second electrode may be deposited on a substrate that comprises a component of a photovoltaic cell. It will be appreciated that various fabrication processes may be advantageously used for preparation of an electrochemical energy storage device included as a component of a photovoltaic system, such as atomic layer deposition, magnetron sputtering, and thermal evaporation. The deposition of various components of the solid state electrochemical energy storage device may optionally be performed at about the same time or subsequent to construction of any electrodes needed or used by the photovoltaic cell. In embodiments, electrodes of a photovoltaic cell are positioned in electrical communication with the first electrode and the second electrode such that electrical energy generated by the photovoltaic cell may be used to charge the electrochemical energy storage device for storage therein or so that electrical energy stored by the solid-state energy storage device may be utilized as needed in place of photovoltaic output.

In embodiments, the solid-state electrochemical energy storage device may comprise a component of a photovoltaic output management system. Advantageously, the electrochemical energy storage device may optionally store electrical power generated by a photovoltaic system in excess of that consumed by a load otherwise powered by the photovoltaic system, which may occur, for example, during times of peak power production or low demand. In some embodiments, the energy stored by the electrochemical energy storage devices may be useful for smoothing the output variability of a photovoltaic system over time and may for example, be useful for maintaining a substantially constant or less variable output from the photovoltaic system as energy production changes from moment to moment (e.g. due to a passing cloud). Additionally, the stored energy may optionally be provided to and used by a load connected to the photovoltaic system when the photovoltaic energy production is lower than that required by the load, such as during times of high demand, or during night or on cloudy days. In this way, the electrochemical energy storage device may enhance the utility of a photovoltaic system by allowing storage of excess energy when generated, use of stored energy when insufficient generation occurs, and maintaining substantially constant output as photovoltaic power is modulated.

In another aspect, methods of making energy storage devices are disclosed. In embodiments, methods of this aspect comprise depositing a first electrode on or over a substrate, such as by using a first controllable deposition method, depositing a solid electrolyte on or over the first electrode, such as by using a second controllable deposition method, and depositing a second electrode on or over the solid electrolyte such as by using a third controllable deposition method. In some embodiments, additional electrolyte and electrode deposition processes may be included in the method in order to generate energy storage devices exhibiting a stacked multilayer configuration.

Useful controllable deposition methods include, but are not limited to those involving atomic layer deposition, magnetron sputtering, chemical vapor deposition, ultraviolet lithography, x-ray lithography, holographic lithography, laser ablation, and thermal evaporation.

Optionally, the deposition of the electrodes generates electrodes of a desired thickness, as described above. For example, in embodiments, a deposited electrode thickness is selected from the range of about 1 nm to about 75 nm. Optionally, the electrodes may comprise oxides of one or more of Fe, Co, Ni, Cu, Mo, Tc, Rh, Pd, Ag, W, Re, Os, Ir, and Pt. Optionally, the electrodes may comprise oxides of one or more of Mn, Fe, Co, Ni, Cu, Mo, Tc, Ru, Rh, Pd, Ag, W, Re, Os, Ir, and Pt.

Optionally, the deposited solid electrolyte comprises one or more of a perovskite ceramic, a ceramic having a perovskite structure, a zirconium ceramic, a ceria-gadolinia ceramic, an alumina ceramic, and any combination of these. Optionally, the deposited solid electrolyte comprises one or more of a perovskite ceramic, a ceramic having a perovskite structure, a zirconium-scandia ceramic, a ceria-gadolinia ceramic, an alumina ceramic, and any combination of these. Optionally, the deposition of the solid electrolyte generates an electrolyte of a desired thickness, as described above. For example, in embodiments, the solid electrolyte has a thickness selected from the range of about 1 nm to about 250 nm. In embodiments, the solid electrolyte comprises or exhibits a crystal structure including voids or crystallographic defects that permit conduction or migration of oxygen ions through the solid electrolyte between about 0° C. and about 100° C. Optionally, the solid electrolyte comprises or exhibits a crystal structure including voids or crystallographic defects that permit conduction or migration of oxygen ions through the solid electrolyte at temperatures less than about 0° C. or greater than about 100° C.

As described above, the solid-state energy storage devices may be incorporated in an integrated circuit. In embodiments, the substrate on which an electrode is deposited comprises a component of an integrated circuit.

In some embodiments, methods of this aspect may include charging and/or discharging an electrochemical energy storage device. For example, a voltage difference may be applied between the first electrode and a second electrode, such as a charging voltage, in order to charge the electrochemical energy storage device. It will be appreciated that, in embodiments, the charging may occur rapidly or substantially instantaneously, such as within a period of seconds or minutes or a fraction thereof, depending on the current available from the voltage source and resistive losses between the voltage source and the electrodes. This rapid charging may also occur, in embodiments, without damaging the electrodes or electrolyte. This may contrast with the charging rate of a conventional battery, which may be limited by the kinetics taking place at the battery electrodes or within the electrolyte, or may be limited because charging at a greater rate may result in damage to the structure of the battery, such as electrode damage or electrolyte damage, and accompanying capacity loss. In embodiments, the electrochemical reactions that occur when charging or discharging the electrochemical energy storage devices occur at or near the electrode surfaces and so the reactions may occur substantially quickly as compared to, for example, intercalation processes or electroplating processes that may occur in conventional batteries. High charge or discharge rates may also or alternatively be aided by the small size dimensions used in the electrochemical energy storage devices, where only a small physical spacing between electrodes exists, allowing ionic migration between the electrodes to occur rapidly. In embodiments, discharging may occur rapidly or substantially instantaneously, such as within a period of seconds or minutes or a fraction thereof. This rapid discharging may also occur, in embodiments, without damaging the electrodes or electrolyte. In embodiments, a discharge rate may be dictated by the resistance of a load applied between the electrodes of the electrochemical energy storage devices and/or resistive losses between the load and the electrodes. In embodiments, the electrochemical energy storage devices may be charged and/or discharged at rates of about C/20, about C/10, about C/5, about C/2, about 1 C, about 2 C, about 5 C or about 10 C or more without inducing damage to the electrochemical energy storage device, such as damage characteristic of capacity loss, electrolyte oxidation or reduction, electrode destruction, etc. Charging times may also vary depending on charging voltage, charging current, etc. Example charging times may be less than about 1 second, less than about 10 seconds, less than about 30 seconds, less than about 1 minute, less than about 5 minutes, less than about 10 minutes, less than about 30 minutes, etc. Beneficially, electrochemical energy storage device embodiments may be discharged to zero charge stored or zero voltage difference between electrodes without inducing damage to the electrochemical energy storage device, such as damage characteristic of capacity loss, electrolyte oxidation or reduction, electrode destruction, etc.

Further, in some embodiments, the electrochemical energy storage devices exhibit exceptional cycle lives. For example, the electrochemical energy storage devices may be charged and discharged any number of times without inducing damage to the electrochemical energy storage device, such as damage characteristic of capacity loss, electrolyte oxidation or reduction, electrode destruction, etc. For example, the electrochemical energy storage devices of some embodiments may be charged and discharged more than about 100 times, more than about 1000 times, more than about 10000 times, more than about 100000 times, or more than about 1000000 times without damaging the electrochemical energy storage device, such as damage characteristic of capacity loss, electrolyte oxidation or reduction, electrode destruction, etc.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION

The present application provides electrochemical energy storage devices and methods of making these devices. The devices are based on a unique architecture involving a pair of metal or metal oxide electrodes with a solid-state electrolyte (also referred to herein as a solid electrolyte) positioned in between the electrodes. For example, the metal or metal oxide electrodes may correspond to certain transition metals or metal oxides. For example, the solid-state electrolyte may correspond to certain ceramics capable of conducting ions through their crystal structure.

Advantageously, electrochemical energy storage device embodiments may be of an entirely solid-state construction. For example, all electrically active layers may also provide structural functions, such that the electrochemical energy storage device is not only entirely self-supporting but capable of reinforcing other elements to which it is conjoined.

Figure 1:
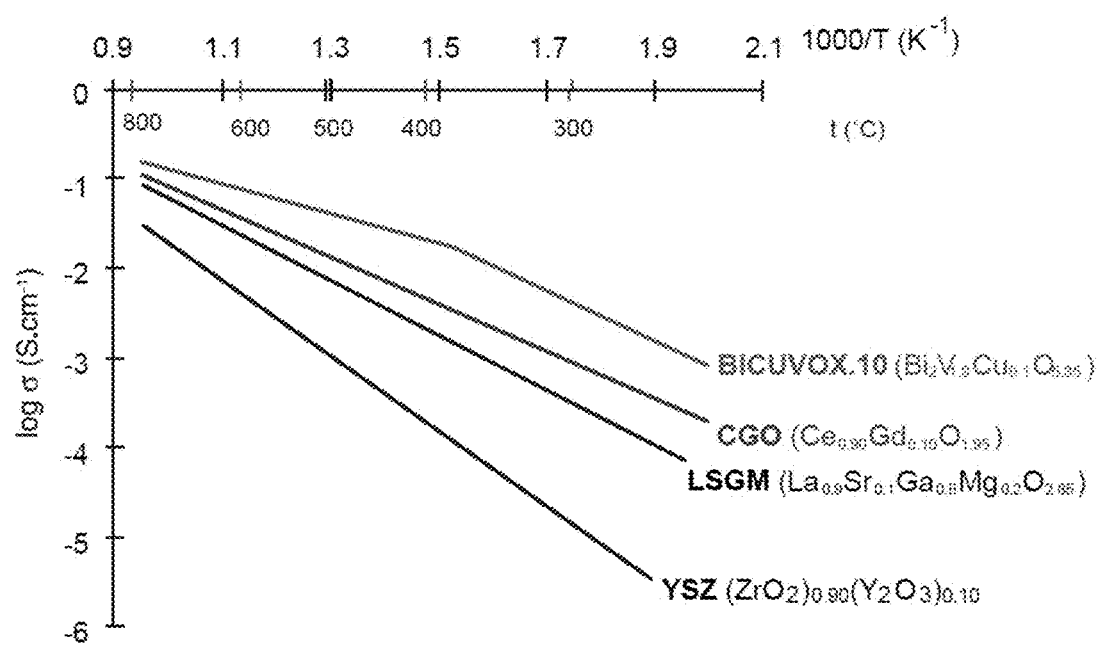
FIG. 1 provides a plot illustrating the relationship of ionic conductivity and temperature for a variety of solid-state electrolytes in the bulk.

FIG. 1 provides details of the ionic conductivity of a number of solid-state ceramic materials in the bulk. It will be appreciated that the conductivity of most of these materials only reaches appreciable values at temperatures exceeding about 300° C. At room temperature, the conductivity values of these ceramic materials are extremely small, making them very effective insulating materials.

The inventors have discovered, however, that thin films of certain solid-state ceramic materials, such as films having thickness of less than about 700 nm in some embodiments, may be engineered to exhibit high ionic conductivity at room temperature. This property allows the solid-state ceramics to function as electrolyte materials, and to exploit this engineered characteristic to permit transmission of ions. Such observation is entirely contrary to the electrical behavior of the solid-state ceramics in the bulk described above.

Figure 2A:
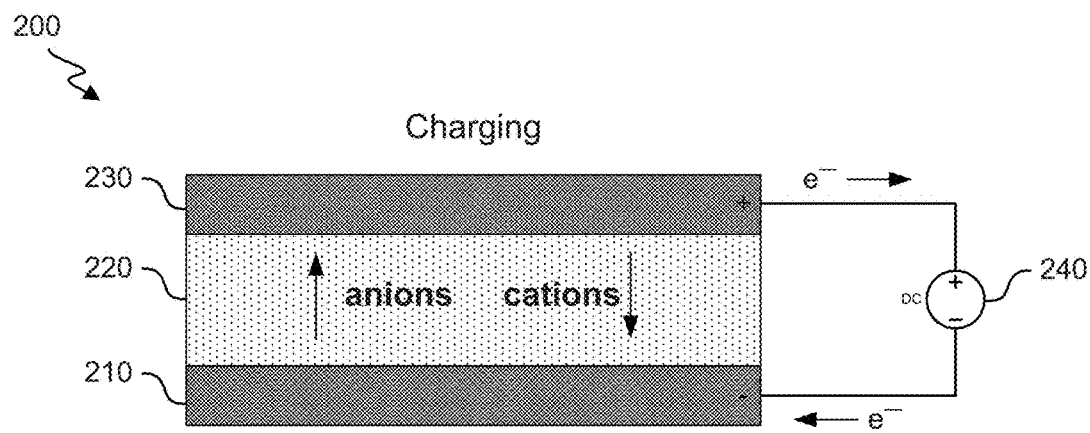
FIG. 2A provides a schematic overview of charging a solid-state electrochemical energy storage device and FIG. 2B provides a schematic overview of discharging a solid-state electrochemical energy storage device.
Figure 2B:
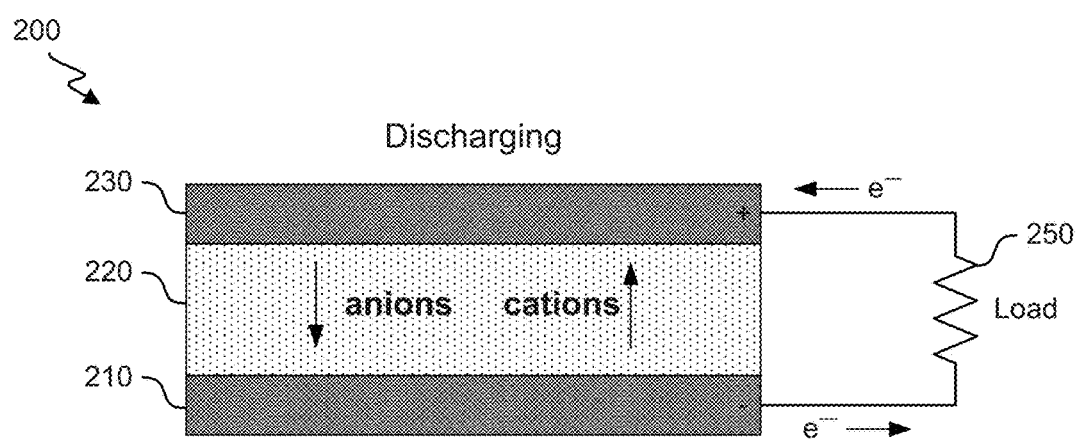

The conduction of ions through the solid-state electrolyte provides the basis for charge storage in some embodiments disclosed herein. FIG. 2A and FIG. 2B provides schematic overviews of charging (FIG. 2A) and discharging (FIG. 2B) of an example solid-state electrochemical charge storage device 200. Here, solid-state electrochemical charge storage device 200 includes a first electrode 210, an electrolyte 220, and a second electrode 230. As shown in FIG. 2A, during a charging operation, anions may be driven from the first electrode 210, through the electrolyte 220, to second electrode 230, while cations may be driven from the second electrode 230, through the electrolyte 220, to first electrode 210. As shown in FIG. 2B, during a discharging operation, cations may be driven from first electrode 210, through the electrolyte 220, to second electrode 230, while anions may be driven from the second electrode 230, through the electrolyte 220, to first electrode 210. It will be appreciated that in some embodiments only a single anionic species may correspond to the working ion, while in other embodiments only a single cationic species may correspond to the working ion. Embodiments are contemplated, however, where multiple ionic species are the working ions, such as multiple anionic species, multiple cationic species, or combinations of anionic species and cationic species. Such identities will be established by the specific chemistry utilized in a specific electrochemical energy storage device.

As depicted in FIG. 2A, during charging, electrons may be provided by a voltage source 240 to the first electrode 210. In embodiments where oxygen anions ($O^{2-}$) correspond to the working ion, the electrons may be used in a reduction reaction at the first electrode where oxygen anions may be released. The oxygen anions may be conducted through the solid electrolyte 220 to the second electrode 230, where they may be taken up by the second electrode and electrons may be released to the voltage source in an oxidation reaction. It will be appreciated that the energy required for the redox reactions, provided by the voltage source, may correspond, at least in part, to the energy electrochemically stored by the electrodes. Other energy storage mechanisms may also contribute to the energy stored by the system, including capacitive energy storage and/or inductive energy storage. Physical/chemical changes to the electrodes may be observed during charging. For example, in embodiments, the first electrode 210 will undergo loss of oxygen atoms and the second electrode 230 will undergo gain of oxygen atoms during charging.

FIG. 2B depicts discharging of the solid-state electrochemical energy storage device 200. The stored energy may be used during discharging by a load 250. In embodiments where oxygen anions ($O^{2-}$) correspond to the working ion, the electrons passed through the load 250 may be used in a reduction reaction at the second electrode where oxygen anions may be released. The oxygen anions may be conducted through the solid electrolyte 220 to the second electrode 230, where they may be taken up by the second electrode and electrons may be released to the voltage source in an oxidation reaction. It will be appreciated that the energy used by the load may correspond, at least in part, to energy electrochemically stored by the electrodes, but other energy storage mechanisms may also contribute, such as capacitive energy storage and/or inductive energy storage. Physical/chemical changes to the electrodes may also be observed during discharging. For example, in one embodiment, the first electrode 210 will undergo gain of oxygen atoms and the second electrode 230 will undergo loss of oxygen atoms during discharging.

Figure 3:
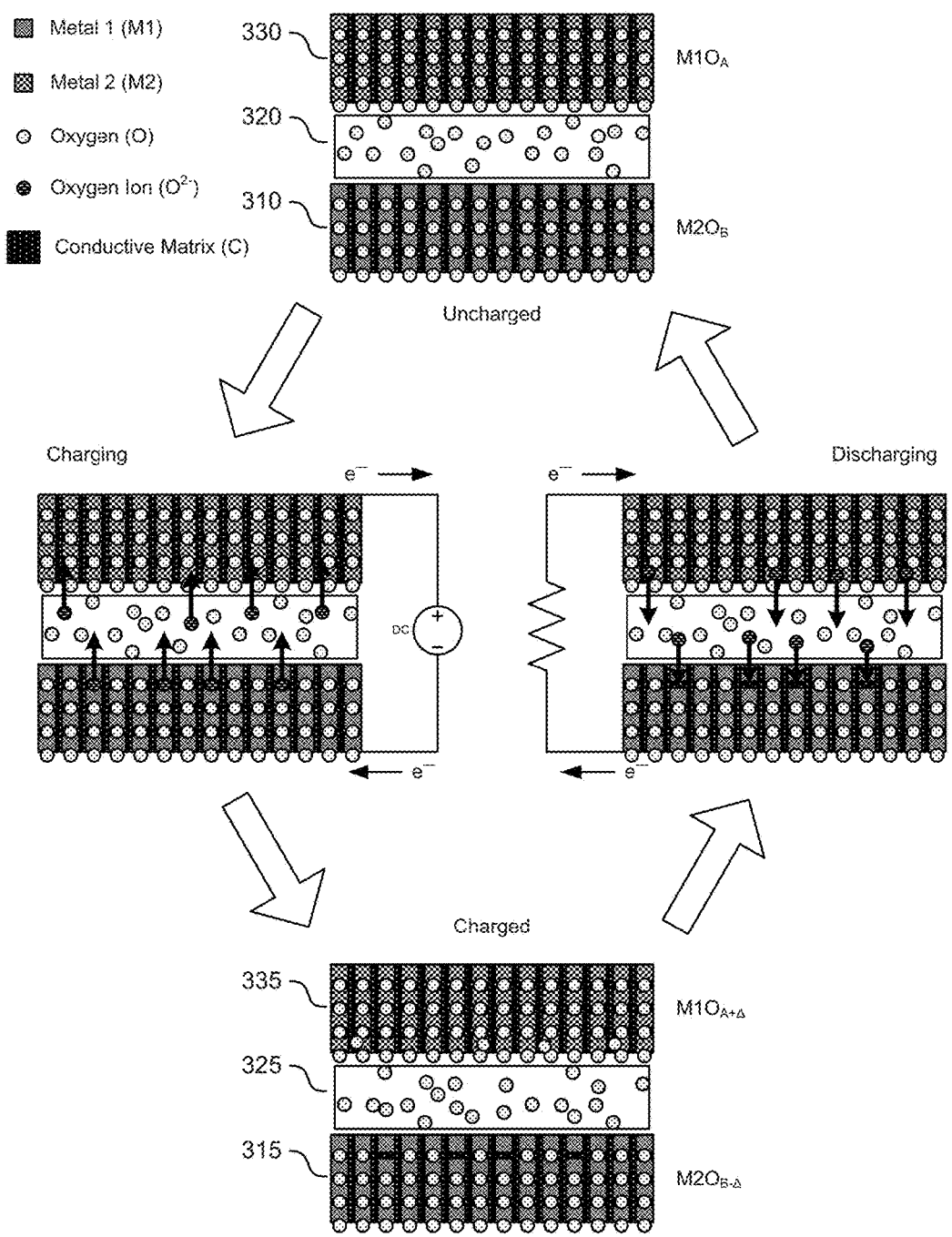
FIG. 3 provides a schematic illustration of processes taking place within a solid-state electrochemical energy storage device.

FIG. 3 provides a schematic overview of charging and discharging of an electrochemical energy storage device where oxygen anions correspond to the working ion. The electrochemical energy storage device of FIG. 3 includes a first electrode 310, a solid electrolyte 320, and a second electrode 330. As illustrated first electrode 310 includes an oxide ($M1O_A$) of a first metal, M1, and second electrode 330 includes an oxide ($M2O_B$) of a second metal M2. It will be appreciated that the two metals may be the same or different and the levels of oxygen present in the different electrodes may also be the same or different.

Additionally, each electrode optionally includes a conductive supporting matrix, in which the metals are distributed. In some embodiments, the conductive supporting matrix may correspond to a carbonaceous material, such as carbon black or graphite, for example. Inclusion of a conductive supporting matrix may be useful for increasing a usable surface area of an electrode. In some embodiments, only a thin layer of the electrode may take part in electrochemical reactions, and so increasing the surface area of the electrode may allow for an increase in the overall amount of the electrode that may take part in the electrochemical reactions.

In the uncharged configuration, bound oxygen atoms may be included in the first electrode 310, the solid electrolyte 320, and the second electrode 330. During charging, however, some of the oxygen atoms may become unbound, such as due to the addition of electrons to the first electrode 310, where the oxygen atoms may become free ions, such as oxygen anions ($O^{2-}$). These oxygen anions may move from first electrode 310 into the solid electrolyte 320. Oxygen ions added to the solid electrolyte 320 may migrate through the solid electrolyte 320 and pass to the second electrode 330. In some circumstances, the oxygen anions added to the solid electrolyte 320 may become bound in the structure of the solid electrolyte 320 and a different oxygen atom may be released from the structure of the solid electrolyte 320 as an oxygen anion, creating an effective migration of the oxygen anion through the solid electrolyte. The oxygen ions that are added to the second electrode 330 may be incorporated into the structure of the second electrode 330.

In the charged configuration, the amounts of oxygen in the first electrode 310 and the second electrode 330 may be different from that in the uncharged configuration. As illustrated, after charging the first electrode 310 may have fewer oxygen atoms included in the structure, as compared to the structure of the first electrode 310 in the uncharged state. Similarly, as illustrated, after charging the second electrode 330 may have more oxygen atoms included in the structure, as compared to the structure of the first electrode 330 in the uncharged state. Thus, the first electrode 310 is illustrated as having a formula of $M1O_{A+\Delta}$, while the second electrode is illustrated as having a formula $M2O_{A-\Delta}$.

During discharging, the opposite migration of oxygen occurs. Some of the oxygen atoms in the second electrode 330 may become unbound, such as due to the addition of electrons, and the unbound oxygen atoms may become oxygen anions. These oxygen anions may move from third electrode 330 into the solid electrolyte 320. Oxygen ions added to the solid electrolyte 320 may migrate through the solid electrolyte 320 and pass to the first electrode 310. The oxygen ions that are added to the first electrode 310 may be reincorporated into the structure of the first electrode 310

Advantageously, for certain embodiments, each electrode may be used as an anode or a cathode, depending on a charging configuration used when initially charging the electrochemical energy storage devices. For example, a first of the two electrodes may be connected to a negative terminal of a voltage source and a second of the two electrodes may be connected to a positive terminal of the voltage source during charging of the electrochemical energy storage device. After charging, the first electrode may function as an anode and the second electrode may function as the cathode. Upon discharging, the electrochemical energy storage device may be recharged in the opposite configuration, i.e., where the first electrode may be connected to the positive terminal of the voltage source and the second electrode may be connected to the negative terminal of the voltage source. After this charging cycle, the first electrode may function as the cathode and the second electrode may function as the anode.

This advantageous configuration may be achieved, in embodiments, by the charge storage mechanism and the chemistry involved. For example, in embodiments, the electrodes may comprise an oxide of the same metal, though levels of oxidation of each of the electrodes may be different and may change during charging and discharging. For example, in a specific embodiment, the electrodes may both comprise an iron oxide. Other examples are possible, including where different metals or metal oxides comprise the different electrodes.

As noted above, in some embodiments, only a small layer of the electrode proximal to the electrolyte may experience significant changes in oxidation state. For example, oxygen ions may be driven to or obtained from shallow depths in the electrodes, in some embodiments, such as a few nm. Accordingly, it may be desirable to form the electrodes as thin as practical so as not to include excess electrode material that is incapable of taking part in electrochemical reactions. Thus, in some embodiments, the electrode thickness may range from about 1 nm to about 10 nm, about 1 nm to about 15 nm, from about 1 nm to about 20 nm, about 1 nm to about 25 nm, from about 1 nm to about 30 nm, about 1 nm to about 35 nm, from about 1 nm to about 40 nm, about 1 nm to about 45 nm, from about 1 nm to about 50 nm, about 1 nm to about 55 nm, from about 1 nm to about 60 nm, about 1 nm to about 65 nm, from about 1 nm to about 70 nm, about 1 nm to about 75 nm. In embodiments, the electrochemical energy storage devices can operate using electrodes of any thickness, including electrodes thicker than about 75 nm, but as noted above, such thicknesses may not be the most efficient use of the electrode material and may contribute weight to the electrochemical energy storage device while not contributing to the energy storage capacity.

Advantageously, the disclosed electrochemical charge storage devices may operate under a variety of different voltage regimes. For example, an initial charging operation may correspond to a first reduction of metal in an anode such that oxygen anions are released by the anode to the solid electrolyte. The oxygen anions may take part in a reaction at the cathode where oxygen anions are adsorbed or otherwise taken up by the cathode to form metal oxides. The cathode will thus be in a more oxidized state after charging. This oxidation may take on different levels as more and more oxygen is driven into the cathode during charging.

Use of certain metals in the cathode may benefit from this increased oxidation, as some metal species are capable of exhibiting different oxidation states. In the case of iron, for example, iron atoms exhibit oxidation states of +1, +2, +3, +4, +5, and +6, though the oxidation states of +2 and +3 may be the most common. If the electrode comprises Fe, a first charging stage may result in electrochemical creation in the cathode of FeO at a first charging voltage. As the FeO becomes saturated with oxygen, a second charging stage may occur, where the FeO becomes further oxidized to form $Fe_2O_3$. This process may continue, with the creation of $Fe_3O_4$, $Fe_5O_6$, $Fe_6O_7$, etc., each formed at increasing charging voltages. It will be appreciated that iron is used here for illustrative purposes and that other metals, such as Mn, Co, Ni, Cu, Mo, Tc, Ru, Rh, Pd, Ag, W, Re, Os, Ir, and/or Pt, may be preferable for use as electrodes, though the principal of the operation of the energy storage device by creation of different oxides at increasing voltages may be applicable. Table 1 and Table 2 respectively summarize different half reactions that may take place during charging and discharging in some embodiments.

It will be appreciated that this increasing oxidation mechanism may allow the electrochemical energy storage devices, in embodiments, to be charged to high voltages, such as where the charged voltage corresponds to a voltage difference between a voltage of a first electrode and a voltage of a second electrode proximal where a single solid electrolyte is positioned between the first and second electrodes. Such charging voltages may be considerably higher than allowed by previous battery chemistries. For example, in embodiments, the electrochemical energy storage devices may be charged to a voltage between about 0 V and about 0.5 V, between about 0 V and about 1 V, between about 0 V and about 1.5 V, between about 0 V and about 2 V, between about 0 V and about 2.5 V, between about 0 V and about 3 V, between about 0 V and about 3.5 V, between about 0 V and about 4 V, between about 0 V and about 4.5 V, between about 0 V and about 5 V, between about 0 V and about 5.5 V, between about 0 V and about 6 V, between about 0 V and about 6.5 V, between about 0 V and about 7 V, between about 0 V and about 7.5 V, between about 0 V and about 8 V, between about 0 V and about 8.5 V, between about 0 V and about 9 V, between about 0 V and about 9.5 V, or between about 0 V and about 10 V. In some embodiments, the electrochemical energy storage devices may be charged to a voltage greater than about 5 V, greater than about 10 V, greater than about 15 V, or greater than about 20 V. It will be appreciated that, in some embodiments, as higher and higher voltages are encountered, an electrical discharge may occur between electrodes and through the solid electrolyte, resulting in loss of stored charge and potential damage to the devices.

TABLE 1

Overview of redox chemistry during charging

| Anode Half Reaction | Cathode Half Reaction |
|---|---|
| Stage 1 Charging | |
| $M1O_X + 2e^- \rightarrow M1O_{X-1} + O^{2-}$ | $M2O_Y + O^{2-} \rightarrow M2O_{Y+1} + 2e^-$ |
| Overall Reaction: $M1O_X + M2O_Y \rightarrow M1O_{X-1} + M2O_{Y+1}$ | |
| Stage 2 Charging | |
| $M1O_{X-1} + 2e^- \rightarrow M1O_{X-2} + O^{2-}$ | $M2O_{Y+1} + O^{2-} \rightarrow M2O_{Y+2} + 2e^-$ |
| Overall Reaction: $M1O_{X-1} + M1O_{Y+1} \rightarrow M2O_{X-2} + M2O_{Y+2}$ | |
| . . . | |
| Stage N Charging | |
| $M1O_{X-(N-1)} + 2e^- \rightarrow M1O_{X-N} + O^{2-}$ | $M2O_{Y+(N-1)} + O^{2-} \rightarrow M2O_{Y+N} + 2e^-$ |
| Overall Reaction: $M1O_{X-(N-1)} + M2O_{Y+(N-1)} \rightarrow M1O_{X-N} + M2O_{Y+N}$ | |

TABLE 2

Overview of redox chemistry during discharging

| Anode Half Reaction | Cathode Half Reaction |
|---|---|
| Stage 1 Discharging | |
| $M1O_X + O^{2-} \rightarrow M1O_{X+1} + 2e^-$ | $M2O_Y + 2e^- \rightarrow M2O_{Y-1} + O^{2-}$ |
| Overall Reaction: $M1O_X + M2O_Y \rightarrow M1O_{X+1} + M2O_{Y-1}$ | |
| Stage 2 Discharging | |
| $M1O_{X+1} + O^{2-} \rightarrow M1O_{X+2} + 2e^-$ | $M2O_{Y-1} + 2e^- \rightarrow M2O_{Y-2} + O^{2-}$ |
| Overall Reaction: $M1O_{X+1} + M2O_{Y-1} \rightarrow M1O_{X+2} + M2O_{Y-2}$ | |
| . . . | |
| Stage N Discharging | |
| $M1O_{X+(N-1)} + O^{2-} \rightarrow M1O_{X+N} + 2e^-$ | $M2O_{Y-(N-1)} + 2e^- \rightarrow M2O_{Y-N} + O^{2-}$ |
| Overall Reaction: $M1O_{X+(N-1)} + M2O_{Y-(N-1)} \rightarrow M1O_{X+N} + M2O_{Y-N}$ | |

Optionally, a solid-state electrochemical energy storage device is fabricated by means of atomic layer deposition, a form of chemical vapor deposition involving precursor chemicals and a two stage deposition process where the deposition chamber must be purged between processing stages. Atomic layer deposition (ALD) permits the formation of layers having a thickness of several nanometers or less and intricate surface features of similar dimensions. Advanced magnetron sputtering may also correspond to a useful deposition technique. Multiple deposition chambers may be useful for performing sequential deposition operations.

It will be appreciated that the above reference to ALD does not preclude the use of other nanofabrication techniques applicable to micro-circuitry either extant or in development, including CVD, thermal evaporation, epitaxial techniques, ultraviolet or X-ray lithography, holographic lithography, thermal evaporation, laser ablation or deposition.

In exemplary embodiments, individual sandwiches or cells comprise electrolytic layers alternating with metal or metal oxide electrodes. Actual charge storage occurs within the electrodes, such as by a process in which oxygen ions are adsorbed on or within the electrodes.

The benefits of the ALD and advanced magnetron sputtering fabrication technique useful with embodiments described herein are several. For example, they permit a high degree of consistency and repeatability and thus a low defect rate. In addition, because they support the formation of three dimensional, high radius features at very small scales, it permits the designer to increase interfacial surface area by many multiples over that afforded by featureless flat surfaces within the same volume. For example, surfaces having contoured topologies that provide increased surface area are useful with various embodiments.

In addition, cells of various embodiments may be built up incrementally, layer by layer. Capacity within a given footprint may be optionally controlled by varying the number of layers and the dimension of depth. The disclosed solid-state electrochemical energy storage devices further lend themselves to the construction of power distribution networks where the electrochemical energy storage devices are made modular and modules are interspersed with active circuitry or transducers. It will be appreciated that strategic depositions performed according to the ALD process or advanced magnetron sputtering can support such architectures. Optionally, the number of modules within such overall architectures may be arbitrarily small or large in number, such as 2 or 3 or as many as about 10 or more than about 10. Modules residing within such architectures may collectively assume the form of star and hub networks, redundant rings, or meshes, for example.

It will be appreciated that, in embodiments, the term "gel" refers to a non-fluid colloidal network or polymer network that is expanded throughout its whole volume by a fluid. As used herein, gels are expressly excluded from consideration as solid materials. Example electrolytes that comprise a gel include, but are not limited to, Nafion, LiPON, etc., which may be used, for example, in thin film lithium batteries. In some embodiments, electrolytes that comprise a gel cannot be prepared by high temperature deposition methods. It will be appreciated that solid-state electrolytes that comprise a gel cannot be prepared by atomic layer deposition. In addition, electrolytes that comprise a gel cannot withstand exposure to temperatures exceeding, for example 100° C., 200° C., 300° C., etc., without undergoing substantial damage to the electrolyte structure and/or without resulting in a substantial decrease in the ionic conductivity of the electrolyte structure.

Figure 4A:
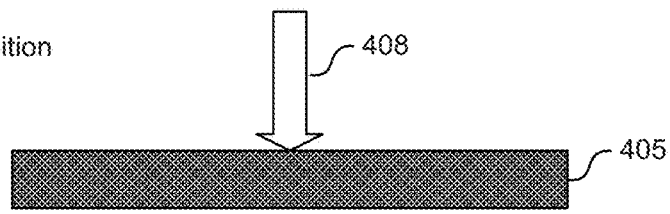
FIG. 4A and FIG. 4B provide overviews of processes for making solid-state electrochemical energy storage devices.
Figure 4A:
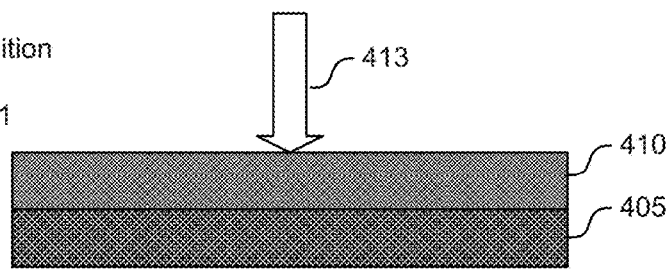
Figure 4A:
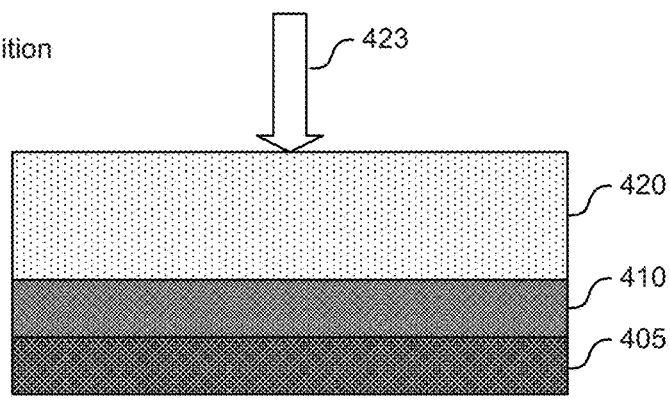
Figure 4A:
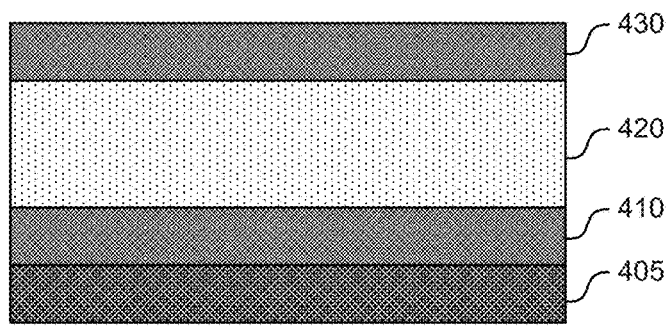

FIG. 4A provides an overview of a process for making an electrochemical energy storage device, in accordance with some embodiments. Initially, a substrate 405 is subjected to a deposition process 408, such as an atomic layer deposition process, where material of a first electrode 410 is deposited onto substrate 405. Use of atomic layer deposition processes is advantageous for controlling the thickness of first electrode 410. Substrate 405 may correspond to any suitable substrate. As an example, substrate 405 may correspond to a portion of an integrated circuit, for example. Substrate 405 may alternatively correspond to a topmost layer of another electrochemical energy storage device.

Next, first electrode 410 is subjected to a second deposition process 413, in order to form a solid electrolyte 420 over the first electrode 410. For example, second deposition process 413 may correspond to an atomic layer deposition process to form a ceramic solid electrolyte. Use of atomic layer deposition processes is advantageous for controlling the thickness of solid electrolyte 420, as is advanced commercial sputtering.

Next, solid electrolyte 420 is subjected to a third deposition process 423, such as an atomic layer deposition process, where material of a second electrode 430 is deposited onto the solid electrolyte 420. Use of atomic layer deposition processes is advantageous for controlling the thickness of second electrode 430, as is advanced commercial sputtering.

Certain properties of the electrochemical energy storage systems described herein are strongly interrelated. For example, the highest level of performance may be achieved through system synergies in which the physical disposition of the active materials supports the most complete electrochemical reactions. As noted above, in some embodiments, higher performance may correspond to using electrodes that are particularly thin or that exhibit high surface area. In some embodiments, higher performance may be achieved by using both sides of one or more electrodes in an electrochemical energy storage device, which may be obtained using a stacked geometry in which a first surface of an electrode is positioned proximal to a first solid electrolyte and a second surface of the electrode is positioned proximal to a second solid electrolyte.

In some embodiments, an electrochemical energy storage device may thus comprise several or hundreds of cells, or more, stacked together in a multi-layer arrangement. In some embodiments, a multi-layer arrangement may comprise a series of stacked electrochemical energy storage cells in which the anode of one cell serves as the cathode of the cell stacked adjacent to it. In some embodiments, a multi-layer arrangement may comprise a plurality of stacked electrochemical energy storage cells in which the anode of one cell also serves as the anode of an adjacent cell and/or in which the cathode of one cell also serves as the cathode of an adjacent cell.

Figure 4B:
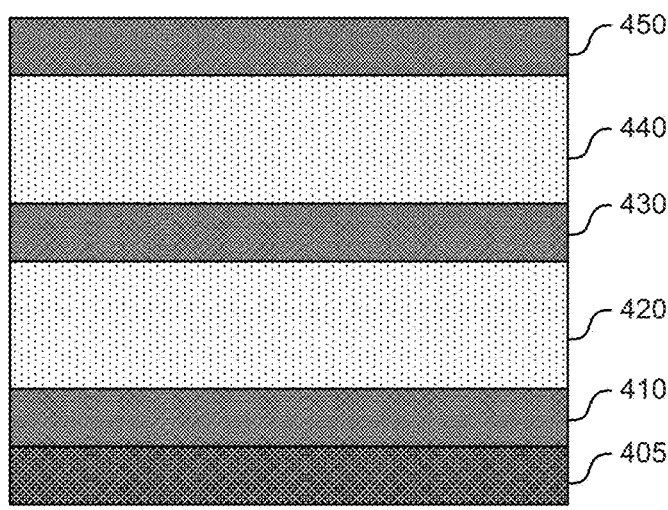

FIG. 4B provides an overview of a process for making a stacked electrochemical energy storage device, in accordance with some embodiments, and continues the process depicted in FIG. 4A. Second electrode 430 is subjected to a fourth deposition process 433, in order to form a second solid electrolyte 440 over the second electrode 430. For example, fourth deposition process 433 may correspond to an atomic layer deposition process to form a ceramic solid electrolyte. Use of atomic layer deposition processes is advantageous for controlling the thickness of second solid electrolyte 440.

Next, second solid electrolyte 440 is subjected to a fifth deposition process 443, such as an atomic layer deposition process, where material of a third electrode 450 is deposited onto second solid electrolyte 440. Use of atomic layer deposition processes is advantageous for controlling the thickness of third electrode 450.

It will be appreciated that additional electrolyte/electrode bilayers may be deposited over an uppermost electrode, similar to the processing depicted in FIG. 4B, in order to form stacked electrochemical energy storage devices of any desired thickness and number of layers.

Figure 5:
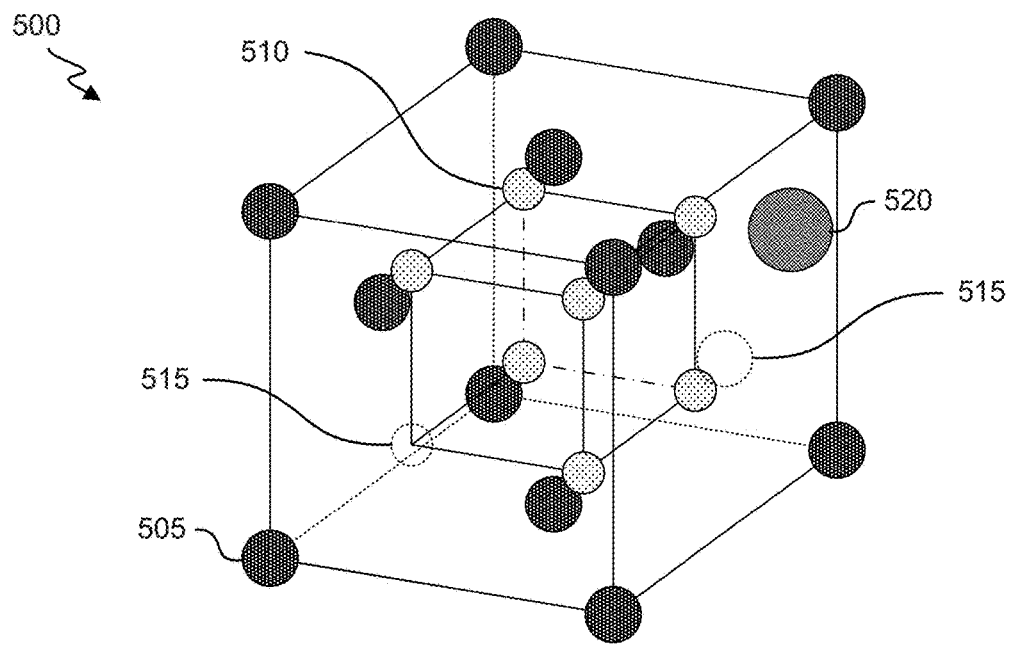
FIG. 5 provides a schematic illustration of the crystal structure of a solid electrolyte, in accordance with some embodiments.

In some embodiments, a solid electrolyte may exhibit a crystalline structure. The solid electrolyte may exhibit a variety of crystal forms, including single crystal and polycrystal. In embodiments where the solid electrolyte includes crystalline material, the solid electrolyte may take on different crystal forms, depending on the specific material configuration of the solid electrolyte. FIG. 5 provides a schematic illustration of a first example crystal structure 500 of a solid electrolyte. It will be appreciated that the crystal structure 500 illustrated may correspond to a ceria or zirconium crystal structure, which is provided here as an example only, and that other crystal structures are possible. For example, in embodiments, the solid electrolyte may comprise a perovskite ceramic, a ceramic having a perovskite structure, a zirconium ceramic, a ceria-gadolinia ceramic, an alumina ceramic, any variant of these, including any doped variant, and any combination of these.

In FIG. 5, various chemical elements make up the crystal structure 500. For example, a first atoms 505, such as metal atoms, may comprise a portion of the crystal structure 500, and second atoms 510, such as oxygen atoms, may comprise a portion of the crystal structure 500. Various defects may be included in the crystal structure 500, which may be naturally occurring or intentionally introduced. As illustrated, crystal structure 500 includes voids or crystallographic defects 515, which may correspond to vacancy defects, for example, where atoms of the crystal structure are missing. Voids and crystallographic defects 515 may be useful for allowing transmission of oxygen anions through the crystal structure 500, and provide for the ability of oxygen anions to efficiently migrate through the solid electrolyte. It will be appreciated that other crystal structure features beyond voids or crystallographic defects such as vacancy defects may also exist in the solid electrolyte, such as crystallographic defects including interstitial defects, line defects, planar defects, bulk defects, and lattice imperfections. An interstitial defect 520 is illustrated. Each of the voids or crystallographic defects may, in some embodiments, contribute to the ability of ions to efficiently migrate through a solid electrolyte.

Figure 6:
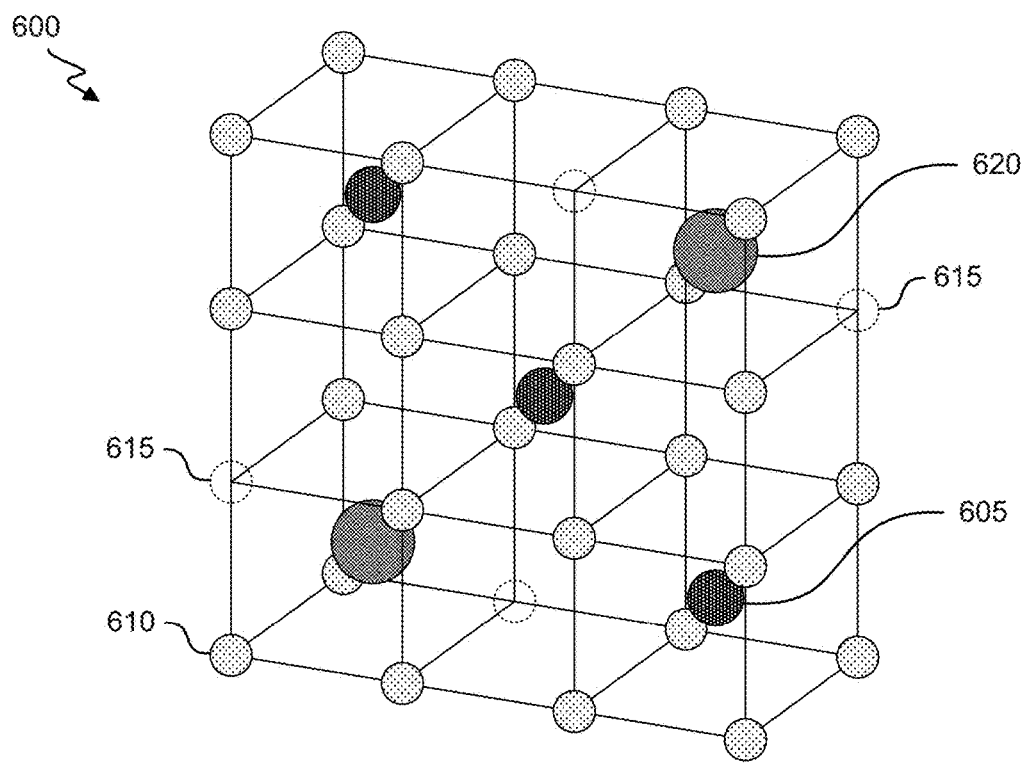
FIG. 6 provides a schematic illustration of the crystal structure of a solid electrolyte, in accordance with some embodiments.

FIG. 6 provides a schematic illustration of another crystal structure 600, which includes a first metal 605, oxygen atoms 610, and crystallographic defects 615. Here, crystallographic defects 615 may correspond to vacancy defects. The crystallographic defects 615 may be generated, for example, by introduction of one or more dopants 620 into the crystal structure 600. In some embodiments, the dopants 620 and crystallographic defects 615 may be introduced, for example, during the formation of the crystal structure, such as during an atomic layer deposition process. In some embodiments, the dopants 620 and crystallographic defects 615 may be introduced after the crystal structure 600 is formed, such as by an ion implantation process. Useful dopants include, but are not limited to, alkali metal dopants, alkaline earth dopants, group 3 dopants, lanthanide dopants, titanium oxide dopants, hydrogen dopants, silver dopants, and/or lead dopants.

In embodiments, when an oxygen anion is added to the crystal structure 600 at a crystallographic defect 615, the electronic configuration of the crystal structure may change, such as due to the extra electrons carried by the oxygen anion. This configuration may create an unstable structure, and so the oxygen atoms may rearrange to accommodate the extra material added to the crystal structure and in this way allow oxygen anions to migrate through the crystal structure.

It will be appreciated that, in some embodiments, the electrochemical energy storage devices described herein may comprise extremely small devices, as the electrodes and electrolyte may comprise layers having thicknesses as small as about 1 nm. For example, total thicknesses of a unit cell may be as small as about 3 nm, for example, or as large as about 1 µm. Some unit cell embodiments may comprise larger thicknesses, however, and multi-cell devices may take on any suitable thickness, as the number of unit cells is virtually without limit. These small unit cell dimensions may provide for a number of the advantageous properties of the devices. For example, in embodiments, the devices may exhibit extremely large electrical energy densities when charged, such as greater than about 10 $J/cm^3$, greater than about 50 $J/cm^3$, greater than about 200 $J/cm^3$, or greater than about 500 $J/cm^3$. Although the amount of energy stored by a single cell may be small, the dimensionality of the cells may allow many hundreds or thousands or more cells to be included within a small volume, magnifying the overall energy storage capacity greatly.

Lateral dimensions for the devices, however may take on any suitable value, and may (at least) linearly contribute to the amount of energy stored by the devices. For example, in some embodiments, the lateral dimensions of the electrodes and the solid electrolyte may be as small as about 20 nm or less, and may be limited by the deposition abilities used during fabrication. Various masking and lithographic processes may be used, for example, to achieve lateral dimensions as small as about 10 nm. In other embodiments, the lateral dimensions may take on larger values, such as greater than 1 µm, greater than 10 µm, greater than 100 µm, greater than 1 mm, greater than 1 cm, or greater than 10 cm. Again, the maximum lateral dimensions achievable may be limited by the deposition abilities used, but are virtually without limit.

One advantage of such miniaturized energy storage devices is that multiple individual devices may be attached to one another to form an energy distribution network. Energy distribution networks of this nature may be useful for providing power at the point of load, minimizing power transmission distances and associated resistive losses and heat generation. Energy distribution networks may also be useful for sequestering attached devices from fluctuating electrical loads engendered by other components. For example, when included in an integrated circuit, such as in combination with inductive coupling, an energy distribution network may protect circuits from electrical fluctuations generated by circuit blocks elsewhere on the wafer.

Another advantage is that backup power may be provided in the event of the failure of any one of the storage devices in the distribution network, and a portfolio of energy resources may be provided within the confines of a single system on a chip, for example. Networking of the devices in an energy distribution may optionally be achieved using one or more addressable switching transistors, which can be used to isolate individual blocks or electrochemical energy storage cells/stacks and/or to route current/voltage to components that have had a failure of their primary power source.

Optionally, the individual cells may in an energy distribution network be connected in series or in parallel and any combinations of series and parallel connections may be made. Such connections may be made highly configurable by the inclusion of switching transistors to set up and dismantle temporary circuit paths.

Figure 7:
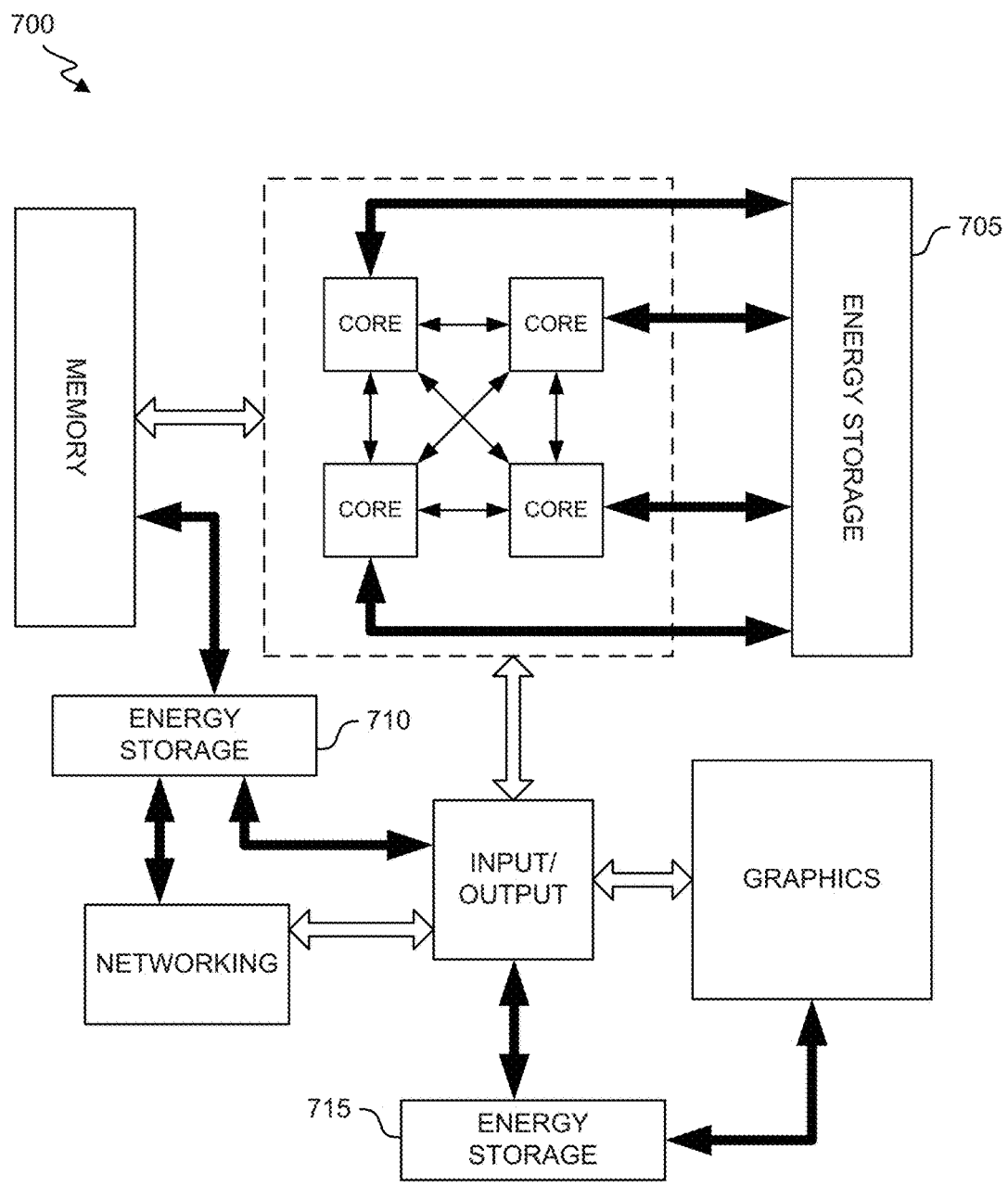
FIG. 7 provides a schematic illustration of a system including electrochemical energy storage devices distributed throughout the circuit.

FIG. 7 provides a schematic overview of a system 700 including a variety of electrochemical energy storage devices 705, 710, 715. System 700 may correspond to a single integrated circuit configured as a system-on-chip, or may correspond to individual or integrated components, in any configuration. The energy storage devices 705, 710, 715 may be used individually as energy sources for one or more other components of system 700, but may also be used in an energy distribution network, as described above, to provide power to any one or more components. In such a configuration, a transistor network may be included, for example, to allow for individually switching the flow of electrical current from any individual energy storage device 705, 710, 715 to any individual component.

As illustrated, however, energy storage devices 705, 710, 715 are shown as separate energy storage devices, providing power to only one or a subset of components of system 700. For example, energy storage device 705 is illustrated as providing power to a central processing unit comprising four individual processing cores. Energy storage device 710 is illustrated as providing power to a memory unit, a network unit, and an input/output unit. Energy storage device 715 is illustrated as providing power to the input/output and a graphics processor. It will be appreciated that the electrical connection providing power from the energy storage devices to another component may be switchably achieved, such as by using one or more transistors, relays, or other controllable switching circuits.

Figure 8:
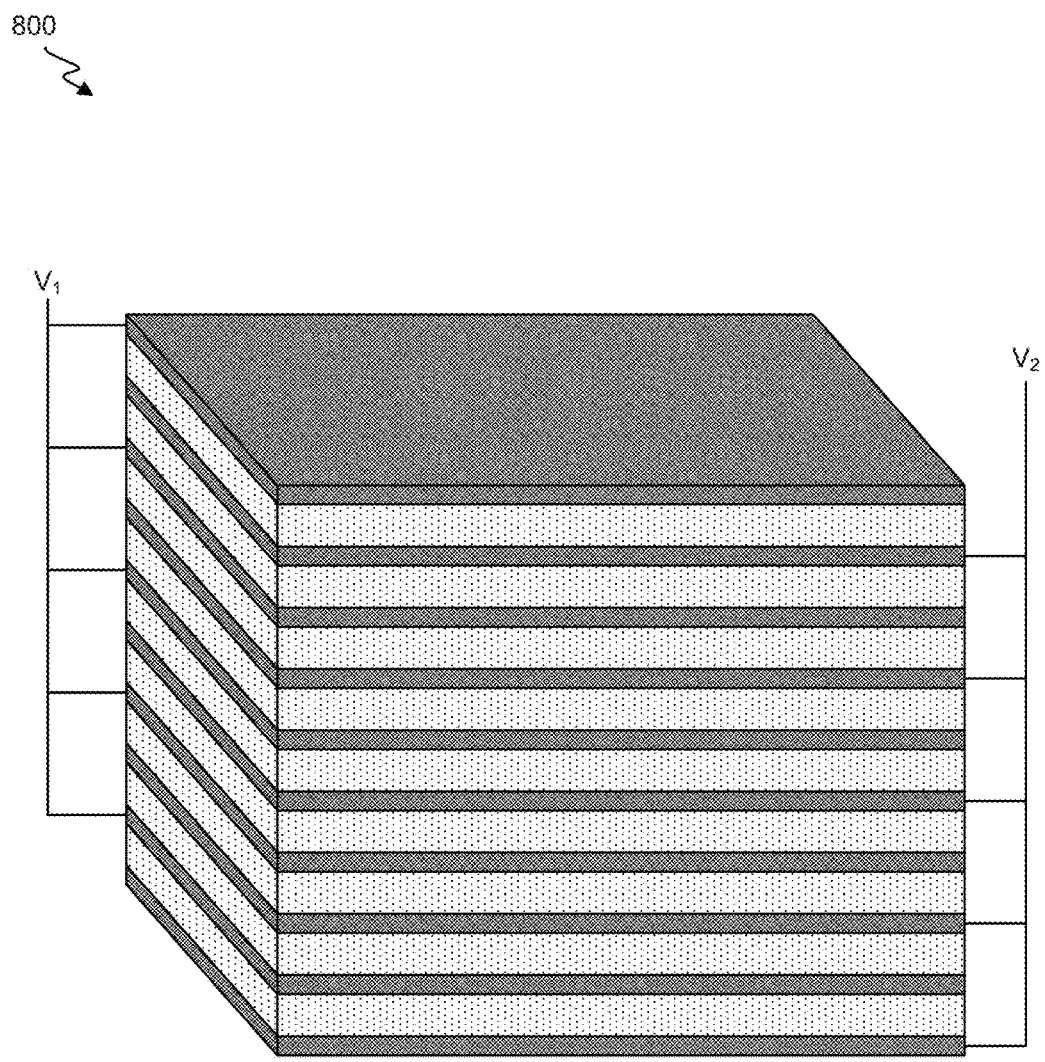
FIG. 8 provides a schematic illustration of a multilayer electrochemical energy storage device.

FIG. 8 provides a schematic illustration of a multilayer electrochemical energy storage device 800. Here, alternating electrodes are connected in a parallel configuration, such that the device comprises a single parallelized energy storage device. For example, every other electrode is electrically connected on a first end, while the remaining electrodes are electrically connected on the opposite end. Other configurations are possible, including series configuration, combined series and parallel configuration, and electrical connections to the electrodes may be made at any suitable position. As illustrated, a first set of electrodes exhibit a first potential ($V_1$), while a second set of the electrodes, interspersed between the first set of electrodes, exhibit a second potential ($V_2$), such that a potential difference between the electrodes is $V_1-V_2$. Solid electrolytes are positioned between each adjacent electrode in FIG. 8.

Figure 9:
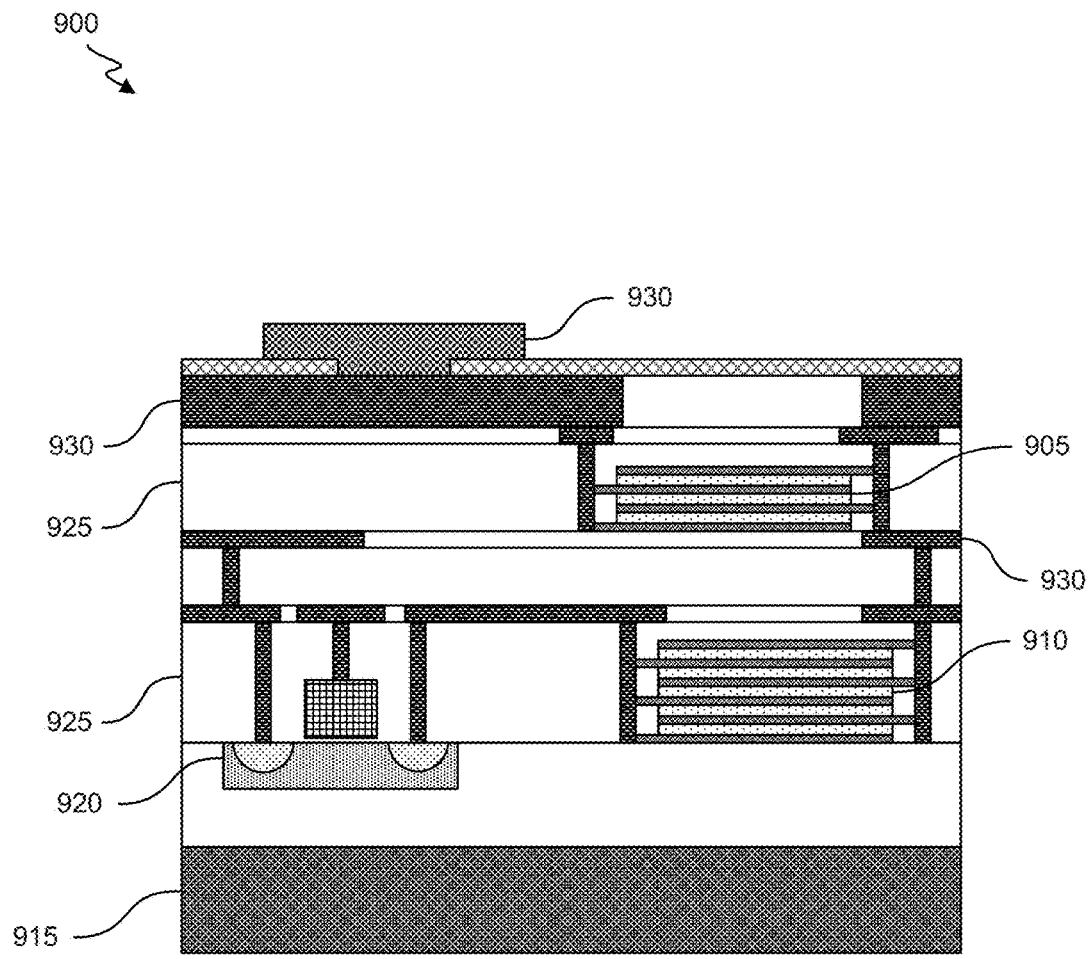
FIG. 9 provides a schematic cross-sectional illustration of an integrated circuit including multilayer electrochemical energy storage devices.

FIG. 9 provides a cross-sectional schematic illustration of an integrated circuit 900 including electrochemical energy storage devices 905 and 910, positioned over a substrate 915. Each of the electrochemical energy storage devices 905 and 910 are illustrated as including multiple unit cells. A transistor 920 is included in the circuit 900, including source, drain, and gate elements. Various insulating/dielectric layers 925 are included, as well as conductive traces 930 between various layers and device components. It will be appreciated that the electrochemical energy storage devices may be distributed and/or networked throughout the integrated circuit as described above.

Inclusion of one or more electrochemical energy storage devices in an integrated circuit, as illustrated in FIG. 9, may be achieved, in embodiments, because the component materials and characteristics may be compatible with the semiconductor fabrication processes used to manufacture the integrated circuit. Further, the techniques used to make the electrochemical energy storage devices, such as atomic layer deposition, magnetron sputtering, masking, lithography, etc., may be already utilized in the fabrication of the semiconductor devices, so additional processing systems and techniques may not have to be developed.

Figure 10A:
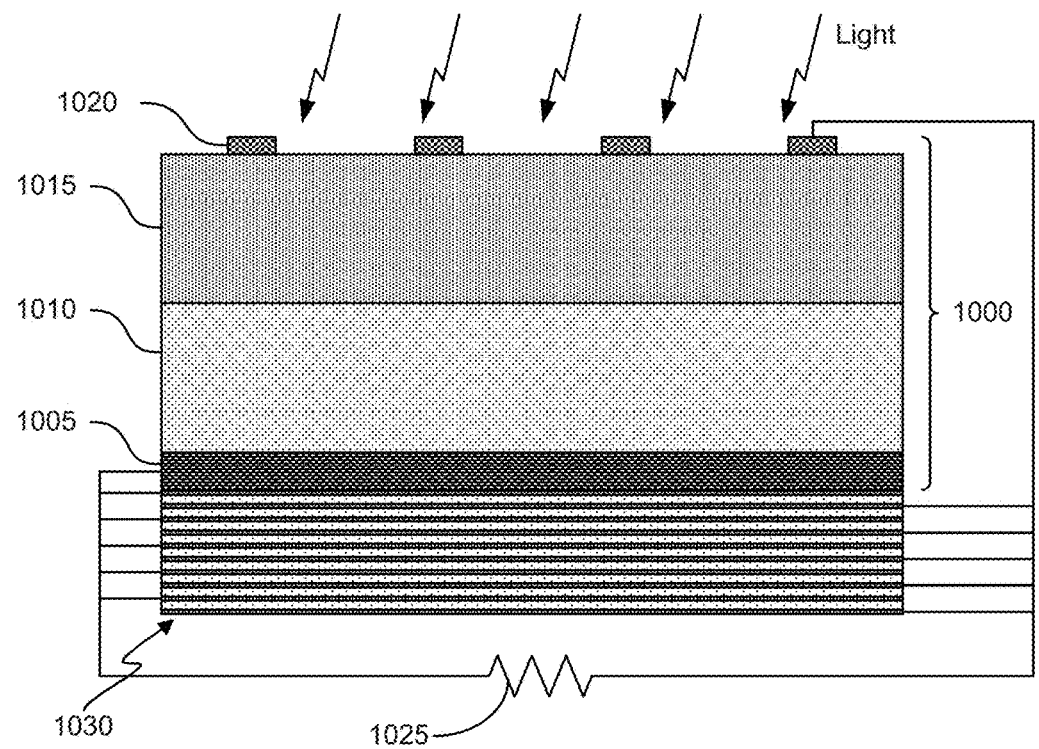
FIG. 10A and FIG. 10B provides schematic cross-sectional illustrations of an photovoltaic device including multilayer electrochemical energy storage devices.
Figure 10B:
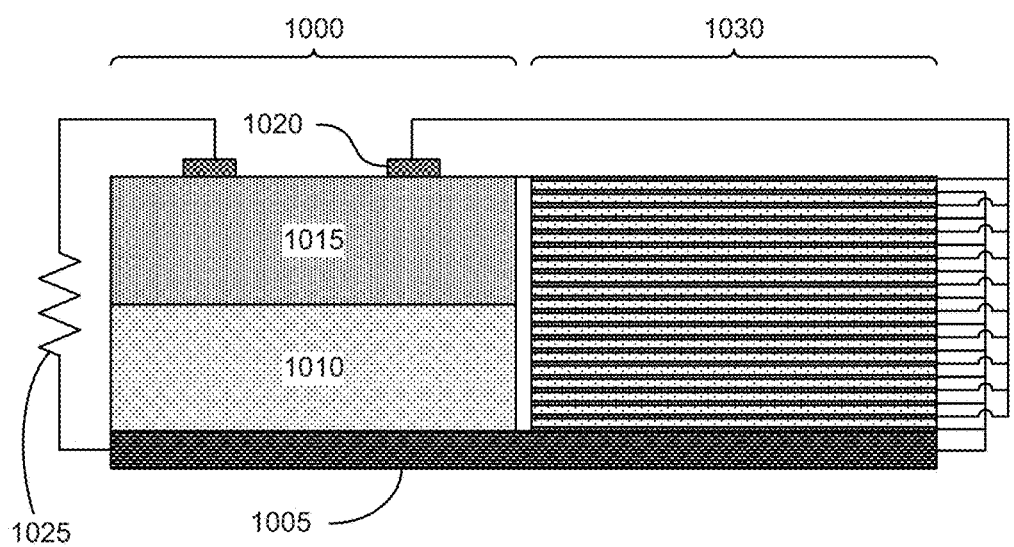

FIG. 10A and FIG. 10B provide cross-sectional schematic illustrations of a photovoltaic cell 1000 integrated with an electrochemical energy storage device 1030. Photovoltaic cell 1000 may optionally comprise any suitable photovoltaic material that is compatible with electrochemical energy storage device 1030 and the fabrication processes for making electrochemical energy storage device 1030. For example, in the embodiments illustrated in FIGS. 10A and 10B, photovoltaic cell 1000 comprises a bottom electrode 1005, a p-type silicon layer 1010, an n-type silicon layer 1015 and a top electrode 1020. Electrochemical energy storage device 1030 comprises multiple layers of electrodes and electrolytes, for example similar to multilayer electrochemical energy storage device 800 described above. A first set of electrodes of electrochemical energy storage device 1030 is illustrated as in electrical communication with top electrode 1020 and a second set of electrodes of electrochemical energy storage device 1030 is illustrated as in electrical communication with bottom electrode 1005. A load 1025 is also illustrated as electrically connected between bottom electrode 1005 and top electrode 1020.

In FIG. 10A, the electrochemical energy storage device 1030 is positioned directly below and optionally in contact with bottom electrode 1005. Such a configuration may be desirable for example, to allow the first electrode of electrochemical energy storage device 1030 to be deposited directly on bottom electrode 1005 during the manufacturing process. Other examples are possible, such as where an interleaving material, such as an insulator, semiconductor, or other conducting material is positioned between bottom electrode 1005 and electrochemical energy storage device 1030. Additionally, different physical arrangements of the photovoltaic cell 1000 and electrochemical energy storage device 1030 are contemplated. As an example, in FIG. 10B, the photovoltaic cell 1000 and electrochemical energy storage device 1030 are positioned side-by-side. Such a configuration may be desirable to allow electrochemical energy storage device 1030 to be positioned within the spaces between adjacent photovoltaic cells, for example. Further arrangements are contemplated, including where the electrochemical energy storage device 1030 and photovoltaic cell 1000 are independent components and where the electrochemical energy storage device 1030 is used as a stand-alone energy storage backup module.

It will be appreciated that providing electrochemical energy storage devices in electrical communication with photovoltaic cells may be useful, in embodiments, for modulating the output of the photovoltaic cell and minimizing variability in cell output. Additionally, when exposed to light, the excess electrical energy generated by the photovoltaic cell may be used to charge the electrochemical energy storage device to store the excess energy. The stored energy may then be provided by the electrochemical energy storage device as voltage output during non-peak times, such as during the night or on cloudy days, for example. Including the electrochemical energy storage devices directly on the same structure as the electrochemical cell is further advantageous for simplifying construction, integration, shipping, etc. Additionally, the use of the electrochemical energy storage devices described herein may be beneficial, for example, as the electrochemical energy storage devices may have large power densities and can receive and provide large current densities as needed, without damaging the electrochemical energy storage devices or degrading their storage capacities. Further, the electrochemical energy storage devices may exhibit large cycle lives without resulting in component degradation or capacity loss, making them beneficial for use in these photovoltaic applications as well as other energy storage applications.

Additional related description may be found in U.S. patent application Ser. No. 13/536,029, filed on Jun. 28, 2012, and U.S. Provisional Application 61/502,797, filed on Jun. 29, 2011, which are hereby incorporated by reference in their entireties.

The present invention may be further understood by reference to the following non-limiting examples.

A. Architecture

Like batteries, the solid-state electrochemical energy storage devices and systems described herein make use of conduction of ions through an electrolyte. For example, the disclosed electrochemical energy storage devices and make use of reversible electrochemical redox reactions that take place at the electrodes with ions that pass through the electrolyte. In the disclosed electrochemical energy storage devices, these reversible redox reactions can occur without limit, and permit full discharge without damage. In some embodiments, an electrochemical energy storage device comprises a simple construction, where two electrodes are separated by a solid-state electrolyte.

B. Temperature

Unlike battery chemistries such as lead/acid and lithium-ion, electrochemical energy storage devices described herein are not restricted by temperature and remain capable of operating within a wide range of temperatures, such as, for example between about −100° C. and about 700° C., although some embodiments may exhibit a certain amount of temperature sensitivity. It will be appreciated that the electrochemical energy storage devices of some embodiments can withstand this temperature range due to the use of ceramic electrolytes instead of liquid, gel, or polymer electrolytes. It will be appreciated that the ceramic materials used as electrolytes herein are not commonly seen to represent electrolytes at ambient temperatures when in bulk, but rather as dielectrics through which neither electrons nor positive ions can move.

C. Electrolyte Materials & Scale

In some embodiments, the disclosed electrochemical energy storage devices use specially doped and extremely thin ceramic films, where the ceramic presents a crystalline lattice with oxygen vacancies through which oxygen ions can flow to interface with the electrodes. The length scales used to achieve the conductivity of oxygen ions vary somewhat from material to material. In some embodiments, the thickness of the ceramic solid-state electrolyte is between about 30 nm and about 100 nm. If the electrolyte exceeds its limits, it reverts to a dielectric rather than an electrolyte, and thus will not function for energy storage, and so in no case does the thickness equal or exceed 1 μm. Conversely, if the electrolyte is too thin, opportunities exist for catastrophic failure by shorting out, such as due to surface roughage or electrostatic discharge from one electrode to the other through the electrolyte.

D. Doping

Basic ceramic materials such as alumina and zirconium in pure form may present monolithic and nonconductive surfaces to the electrodes if used in an electrochemical energy storage device. In order to present a lattice that contains the oxygen vacancies useful for ionic conductivity, some pure ceramic materials may require doping. The doping may, for example, create lattice imperfections, crystallographic defects, or ion carrier sites that the extremely small thickness scale can exploit. In some cases, this amounts to creating an alloy, such as where the dopant is as much as 50% of the material. Na+ doped alumina (β-alumina), is an example.

E. Energy Density & Charge

Due to the small amounts of material incorporated into the electrochemical energy storage devices at the scales used in various embodiments, only small amounts of charge will be stored, even with a relatively high energy density. In certain embodiments, however, such as integrated into electronic circuitry in semiconductor chip fabrication, this small amount of charge can provide power at the point of load on an instantaneous basis. In addition, inductive coupling from a nearby source can be used in some embodiments to continuously recharge the electrochemical energy storage devices.

In more general applications, such as replacement batteries for a consumer electronic device, such as a smart phone or laptop battery, embodiments may require multiple layers or cells to provide the needed current. For example, multiple layers of electrochemical energy storage devices may be constructed on top of one another to achieve larger amounts of charge storage. Given the small thicknesses, many thousands of layers of electrodes and solid-state electrolytes can, in embodiments, be constructed within common battery pack sizes, such as on the order of about 1 cm to about 10 cm. Techniques, such as advanced commercial magnetron sputtering, atomic layer deposition, and other nanoscale deposition techniques allow economical fabrication of such multi-celled devices.

In a specific embodiment, a combination of two electrodes and one electrolyte layer constitutes a single cell. Optionally, the electrochemical energy storage device may consist of a single cell or less than about 50 cells, such as in a continuous stacking configuration. The electrochemical energy storage device may optionally be reduced to a depth that is commensurate with complete integration into a wafer based microcircuit where the electrochemical energy storage device shares the same wafer as the active circuitry.

F. Field Specifics

In some embodiments, multi-celled electrochemical energy storage devices comprising multiple layers of electrodes in between electrolytes may deliver even more energy storage/unit size than lithium-ion can attain. In embodiments, replacement devices can use drop-in replacement form factors, where the electrochemical energy storage device may measure a few microns to a few mm in thickness or larger, with the remaining form consisting of a case enabling direct replacement in existing devices. Using inductive charging, some embodiments may store enough charge that electronic devices would never need direct, wired, charging beyond the first time.

G. Chip Integration

As described in more detail below, many batteries identified as "solid-state" batteries are not truly solid-state. For example, the electrolyte in these batteries typically comprises a gel or a powder or a colloidal suspension. It will be appreciated that these materials cannot withstand large temperature variations used in common semiconductor fabrication process, and thus are incompatible with integrated circuits, for example. Gel electrolytes behave analogously to aqueous electrolytes where crystallinity is not present and ions are not bound but are free to pass across the fluid or semifluid medium, impelled by electrical forces. Other devices may have a crystalline electrolyte, but use a liquid electrode.

In contrast, the electrochemical energy storage devices described herein make use of rigid crystalline lattice structures. For example, defects may be deliberately and artfully introduced to the crystal lattice in order to provide transient pathways for the movement of ions. These pathways may be engineered and organized by various techniques involving the introduction of chemical dopants or by the imposition of strain or by the application of outside forces, either transient or persisting. Such forces tend to deform the lattice structure such that paths for ionic migration become present, for example. These design strategies executed on the molecular and supramolecular level may be used to regulate the volume of ionic flow, and the process may involve beneficial nonlinearities with respect to ionic volume that may be exploited.

H. Electrochemical Energy Storage Device Architecture

In a solid electrolyte, such as a thin ceria stabilized zirconia layer situated between two metal or metal oxide electrodes, oxygen ions may shuttle between the electrodes bearing opposing charges. Without wishing to be bound by any theory, the inventors believe that the positive ions move by traversing through the interstices of a fairly rigid crystalline lattice of extremely limited depth (thin-film), but rich in oxygen vacancies, and it is the oxygen vacancies that permit the free movement of positive ions. A trade-off exists between high ionic conductivity and multiple-layer requirements. The movement of ions through the solid-state electrolyte may also be further tuned by the imposition of external stresses, such as those caused by a bi- or multi-layer electrolyte, that deform the lattice and widen the passageways for ionic movement. In either stressed or unstressed cases, the ions participating in electrochemical storage act as replacements for atoms distributed within the electrolyte, and these ions hop from site to site.

I. Temperature Range and Integrated Circuit Integration

The completely solid, gel-free electrochemical energy storage devices disclosed herein are capable of withstanding very large temperature variations. For example, some embodiments may be useful between about −100° C. and about 800° C. In addition, the devices, due to the lack of liquid or gel materials, may be rugged and capable of integration into active semiconductor circuitry. In terms of size reduction, this can reduce, for example, the size of an integrated circuit, such as a central processing unit, by about 70%, due to the elimination of pin connectors and attendant circuitry, in some embodiments, which may be accompanied by a corresponding reduction of heat generation. In addition, the electrochemical energy storage devices, such as when coupled inductively, permit redundant instantaneous power at point of load.

Additionally, the electrochemical energy storage can take the form, in some embodiments, of a network of cells. Printed conductive traces may convey the stored energy to its destination and switching matrices may allow for powering any of the circuit components by any of the cells, in any combination. For example, some cells may power logic circuits, while other cells may power mixed signal circuits.

Switching between and among energy storage cells may take the form of star and hub architectures, redundant rings, or mesh networks with or without intelligence. Such architectures may serve to support power at the point of load design strategies or islanding of defective cells or adjustments in voltage and current by making cell to cell connection switchable.

It will be appreciated that, because of the flexibility afforded by the materials and architectures used in the electrochemical energy storage devices, an array of cells may be planar, three dimensional, or may comprise a succession of stacked planes, for example. In addition, planar inductors may, optionally, be incorporated along with the storage cells such that islands of energy storage may be inductively coupled with one another, reducing the number of conductive pathways and the mass and volume of an integrated circuit incorporating energy storage.

In some embodiments, the materials that comprise an electrochemical energy storage device may be rendered rigid and unyielding or flexible, depending upon the thickness of the material and the presence or absence of porosity within it. Energy storage may thus be incorporated in flexible thin films such as displays or thin film photovoltaic cells or in energy harvesting devices dependent upon the movement of membranes to generate electrical power, for example. In addition, caseless batteries may constructed in which the electrodes and electrolytes provide structural integrity to the batteries. In some embodiments, the electrochemical energy storage devices may also be integrated with planar energy harvesting radio frequency antennas or with generator and actuator MEMS elements, so that microelectromechanical energy storage, power electronics, and signal processing may be incorporated into a single wafer with a high degree of synergy and integration among the separate elements.

J. Gel-Free

Embodiments of the present invention relate to solid-state electrochemical energy storage devices and methods of making solid-state electrochemical energy storage device in which components of the devices are truly solid-state (i.e., they do not comprise a gel). The solid-state battery nomenclature is not new but it has always been misleading in the prior art. Many "solid-state batteries" utilize either gels or in some case powders for the electrolyte layers and never homogenous, consolidated solid materials that can integrate into semiconductor chips directly, for example. Gel materials prohibit both incorporation within VLSI/ULSI chips, and restrict temperature ranges to approximately ambient.

True solid-state electrolyte layers have been utilized in solid oxide fuel cells. When used in a solid oxide fuel cell, solid-state electrolyte layers normally conduct ions at a practical rate only at extremely elevated temperature, such as exceeding 600° C. However, the solid electrolyte layers described herein exhibit high ionic conductivity, which may approximate or exceed that of liquid or gel electrolytes, even at ambient or near ambient temperatures. The ambient temperature ionic conduction exploited herein also offers a further advantage of preserving high electrical resistance and dielectric strength, which are commonly sacrificed in solid-state supertonic conductors at high temperatures.

In exemplary embodiments, gaseous oxygen ($O_2$) and/or oxygen ions (e.g., $O^+$ or $O^{2-}$) are responsible for charge transport and formation of the electrochemical bonds (redox) by which electrical charge is stored and conserved. A number of transport mechanisms may invoke the passage of oxygen ions through the crystalline structure of the solid electrolyte layer. For example, oxygen vacancies within the crystal lattice may be an important source of ion transport.

It will be appreciated that oxygen vacancies may represent defects, and may be present when the ceramic has been doped with another chemical which results in a departure from the regularity of the crystalline structure present in the pure ceramic. Such defects may be analogous to "holes" in P type semiconductors, for example. It may be advantageous if the ceramic and/or the dopant contains the element that will be ionized, and some of that element may be dislodged from the crystal structure. Additional ions may be drawn from the anode or the cathode, or from the atmospheric air if oxygen ions participate in the electrochemical reactions.

The ionic conduction modes in ceramic electrolytes are very different from those present in aqueous or polymer electrolytes where no crystalline lattice is present and where ions are released by means of electrolysis or simply pass through the fluid medium from the electrodes. In true solid electrolytes, as opposed to gels, both chemistry and mechanical forces play a role in ionic migration as does the phase of the crystalline structure, i.e. whether it is amorphous or cubic.

The addition of dopants alone may not provide a high degree of ionic conductivity under ordinary circumstances, and some solid electrolyte materials will not conduct ions at all at macro scale thicknesses and at ambient temperatures, for example. In some embodiments, violent flexures and dislocations of the lattice structure are required to support interstitial movements of ions.

Such flexures may take the form of phonons, that is, thermally induced periodic oscillations at audio frequencies or more enduring surface strains imposed by the fabrication process or by the presence of micro-actuators such as piezoelectric elements that exert shear forces. Either mechanism may provide spaces through which positive ions may be transported.

It will be appreciated that zirconia and other ceramics may be suitable as solid electrolytes. In some embodiments, useful ceramics include doped ceramics. For example, calcium, magnesium, yttrium, aluminum, and ceria stabilized zirconias may also be useful solid electrolytes.

K. Fabrication

In embodiments, a solid-state electrolyte layer, which may be a consolidated structural layer, offers many performance advantages. For example, the structural integrity conferred by a solid electrolyte combined with solid electrodes may eliminate the need for an external case, in some embodiments. For example, in one embodiment, the electrochemical energy storage device can be naked, i.e., not associated with any other structural materials. In some embodiments, the electrochemical energy storage device may be built up as an integral circuit element within a larger microcircuit with wafer fabrication techniques. These examples may not possible with conventional battery technologies. The solid-state electrochemical cells described herein also may possess inherent physical robustness and a high immunity to shock, vibration, and temperature extremes. In addition, the solid-state electrochemical energy storage devices described herein are highly scalable such that they may be closely coupled to such entities as MEMS devices and microfluidic systems.

In exemplary embodiments, a solid-state electrochemical energy storage device becomes, in essence, another circuit element in an integrated circuit and facilitates the realization of optimal circuit paths and grounding schemes because it lends itself to strategic placement within the overall circuit. In some embodiments, this can eliminate as much as 70% of the circuitry (e.g., the portion served by power pins) in existing VLSI/ULSI chips, greatly reducing size and heat generation.

L. Point of Load Power and Inductive Charging

Solid-state construction has implications that are as potentially as revolutionary with respect to electrical charge storage as they have been to active circuitry when transistors largely replaced vacuum tubes (thermionic valves) more than a half-century ago. For example, just as transistors invoke different mechanisms for controlling the passage of current through a circuit and realization of voltage and current gain, solid-state electrochemical energy storage devices may utilize unique mechanisms for storing and releasing electrical charge at the point of load. Also importantly, solid-state electrochemical energy storage devices exhibit an ability to charge rapidly by inductive coupling (rapidity due to the ability to resist overcharging), permitting wireless charging and potentially eliminating need for nearby power sources entirely.

It should be understood that, in various embodiments, the solid-state electrochemical energy storage devices described herein categorically reference redox reactions. In this text, oxygen may stand for any of those. In exemplary embodiments, charge storage may be achieved through truly reversible redox reactions occurring adsorptively some little distance into the depths of the electrode layer. That depth may be in the angstroms or into the low nanometers, and, to be more specific, less than 10 nanometers. Oxygen ions may form the basis of the electrochemical reactions.

Without wishing to be bound by any theory, oxygen ions may enter and leave the electrodes during the charge/discharge cycles, and are adsorbed to depths of about 0.2 nm to about 10 nm, such as about 0.5 nm, about 1 nm, about 2 nm, about 3 nm, about 4 nm, about 5 nm, about 6 nm, about 7 nm, about 8 nm, about 9 nm, about 10 nm, or any combination of ranges between any of these specific values. In exemplary embodiments, the electrodes themselves range in overall depth/thickness from between about 7 nm to about 50 nm.

Uniquely, multiple redox reactions may be invoked, and successively higher oxides may be formed at successively higher input voltages. For example, in some embodiments, exemplary electrode materials comprise, consist of, or consist essentially of elemental metals or metal oxides capable of forming a sequence of oxides of progressively greater molecular weight. These may include, for example, monoxides, dioxides, trioxides, tetroxides, pentoxides, hexoxides, heptoxides, and so on. In some embodiments, hydrides or nitrides may be substituted for oxides. Work functions for candidate materials may, for example, range between about 4 electron volts and about 5 electron volts and may also include values between these limits.

In exemplary embodiments, electrolyte layers comprise ceramic compositions supporting expeditious transfer of positive oxygen ions from the anode to the cathode or from the cathode to the anode at ambient or near ambient temperatures. Transfer rates optionally range from about 10 to about 50 Siemens per centimeter, and these rates may be greater in architectures where the electrolyte thickness is less than about 58 nm. Useful ceramic compositions include a number of perovskites and perovskite-related oxides, as well as many zirconium ceramics, such as zirconia-scandia, $Zr_{1-x}Sc_xO_{2-\delta}$ and the cheaper zirconium stabilized by yttria, and ceria-gadolinia, $Ce_{1-x}Gd_xO_{2-\delta}$ (CGO), alumina and β-alumina formulated with a number of dopants such as ceramic forms of $Na^+$, $K^+$, $Li^+$, $Ag^+$, $H^+$, $Pb_2^+$, $Sr_2^+$ or $Ba_2$, $TiO$, $TiO_2$, $Ti_2O_3$, etc.

M. Evacuated Electrolyte

Alternatively, the electrolyte layer may be largely evacuated, and the resulting cavity may be supported with minute spacers measuring between about 20 nm and about 100 nm, for example. In such instances, the cavity is optionally filled with gaseous oxygen (or hydrogen or nitrogen) at a pressure of about 0.1 bar, or about 0.2 bar or about 0.3 bar, or at fractional or intermediate values or ranges between these stated numbers.

In one embodiment, the gas may, for example, be ionized by a pair of lateral electrodes that impose a transient high voltage on the gas, such as a voltage that imparts an electric field of sufficient strength to ionize the gas.

N. Enhanced Ionic Conductivity Dependencies

Thin-film scale and temperatures. Invoking high ionic conductivity for purposes of fabricating electrochemical energy storage devices via thin-film deposition of the solid-state electrolytes may involve two aspects. The first, thickness of the film, may dominate at all enhanced ionic conductivity temperatures. Temperature itself plays a significant role, especially at thicker (but still thin) films.

Enhanced ionic conductivity in the sense of orders of magnitude greater than bulk ionic conduction for the above mentioned solid-state electrolytes is exhibited below a particular thickness, which may vary from material to material. As an example, the enhancement for electrolytes in the zirconium family begins at below about 700 nm. Thicker than that, bulk material characteristics dominate and the well-known Arrhenius formula apply. In smaller thickness electrolytes, the enhanced ionic migration is observed and embodiments described herein may make use of this advantageous property.

Temperature-dependent enhanced ionic conductivity is observed, in embodiments, when the interface conductance is greater than that of the bulk—that is, thinner than a threshold of about 700 nm. Invoking ambient temperature performance requires films with acceptable ranges, for example, lower than about 62 nm, in some embodiments. The range from 30 nm to 1 nm may provide exceptional performance, with 1 nm providing negligible resistance to ionic flow while still continuing electron holdoff.

Strained interfaces. Another technique for invoking enhanced ionic migration involves a strained membrane or film. This may be achieved via deposition of heterogeneous electrolyte materials in sandwiched form, such as perovskites/zirconium compounds/perovskites, or the reverse order. Films of substantially less than 1 μm may be useful for achieving the enhanced ionic migration in this way.

Advantageous aspects of the described electrochemical energy storage devices include, but are not limited to:

A true, gel-free, solid-state electrochemical energy storage device with solid metallic or metal oxide electrodes and solid electrolyte layers having structural as well as electrical properties. The electrolyte layers consist of glass or ceramic compositions capable of supporting massive ionic migrations at the dimensions specified, and at ambient or near ambient temperature.

Bi-layer electrodes capable of forming oxides and successions of higher oxides in the presence of an electrical charge.

An elementary unit consisting of a single cell comprised of two electrodes and an electrolyte layer all of solid, consolidated construction.

A structural electrochemical energy storage device that is self-supporting and requires no external case.

Methods of construction such as atomic layer deposition and advanced commercial sputtering that permit full integration of storage into integrated circuits.

An elementary unit consisting of two electrodes separated by spacers or an open framework which is constructed on the nano-scale and affords a volume for containing gaseous oxygen as a source of ions.

A means of ionizing the confined oxygen.

A cell thickness of less than about 200 nanometers and as little as about 30 nanometers and any intermediate value.

An electrode thickness of less than about 50 nanometers and more than about 5 nanometers.

An electrolyte layer thickness of less than about 150 nanometers and no less than about 20 nanometers.

A multi-layer construction ranging from 2 cells up to thousands of cells and any number in between.

A multi-layer construction having any combination of series and parallel connections between and among cells.

A modular design incorporating dispersed energy storage units.

A switching network for addressing dispersed energy storage units.

A capability of undergoing full discharge without incurring damage or degradation.

A formula that enables selection of appropriate electrode materials based on a variety of factors including work function, oxidation number, performance under various temperatures, and availability.

A formula that enables the selection of appropriate solid electrolyte materials based on factors including atomic voids and/or band gaps and membrane stress that permit oxygen ion migration through the electrolyte, and performance under various temperatures.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A Faradaic solid-state energy storage device comprising:
    a first electrode,
        wherein the first electrode has a first thickness greater than 1 nm and less than or equal to 80 nm, and
        wherein the first electrode comprises a first redox-supporting transition metal, an oxide of the first redox-supporting transition metal, or a combination of the first redox-supporting transition metal and the oxide of the first redox-supporting transition metal;
    a solid electrolyte positioned in direct contact with the first electrode,
        wherein the solid electrolyte has a second thickness greater than 1 nm and less than or equal to 500 nm, and
        wherein the solid electrolyte comprises a solid-state, oxygen ion conducting ceramic electrolyte, wherein the solid-state, oxygen ion conducting ceramic electrolyte has a crystal structure including vacancies that permit conduction or migration of oxygen ions through the crystal structure; and
    a second electrode positioned in direct contact with the solid electrolyte,
        wherein the second electrode has a third thickness greater than 1 nm and less than or equal to 80 nm, and
        wherein the second electrode comprises a second redox-supporting transition metal, an oxide of the second redox-supporting transition metal, or a combination of the second redox-supporting transition metal and the oxide of the second redox-supporting transition metal.

2. The Faradaic solid-state energy storage device of claim 1, wherein the first electrode is dispersed on a first electrically conductive supporting substrate, or wherein the second electrode is dispersed on a second electrically conductive supporting substrate, or both.

3. The Faradaic solid-state energy storage device of claim 1, wherein the first electrode, the second electrode, and the solid electrolyte are independently fabricated using a controllable deposition method including one or more techniques selected from the group consisting of: atomic layer deposition, magnetron sputtering, sputter deposition, molecular beam epitaxy, pulsed deposition, and chemical vapor deposition.

4. The Faradaic solid-state energy storage device of claim 1, wherein the first thickness and the third thickness are independently between 10 nm and 80 nm and wherein the second thickness is between 15 nm and 500 nm.

5. The Faradaic solid-state energy storage device of claim 1, wherein the first redox-supporting transition metal, the second redox-supporting transition metal, or both the first redox-supporting transition metal and the second redox-supporting transition metal comprise a transition metal having two non-zero oxidation states.

6. The Faradaic solid-state energy storage device of claim 1, wherein the first redox-supporting transition metal and the second redox-supporting transition metal have different oxidation states.

7. The Faradaic solid-state energy storage device of claim 1, wherein the first redox-supporting transition metal and the second redox-supporting transition metal are independently Co, or Ni.

8. The Faradaic solid-state energy storage device of claim 1, wherein the first redox-supporting transition metal comprises ruthenium, wherein the second redox-supporting transition metal comprises ruthenium, or wherein both the first redox-supporting transition metal and the second redox-supporting transition metal comprise ruthenium.

9. The Faradaic solid-state energy storage device of claim 1, wherein the first redox-supporting transition metal and the second redox-supporting transtion metal exhibit between 3 and 6 positive oxidation states.

10. The Faradaic solid-state energy storage device of claim 1, wherein the solid electrolyte has a temperature of between 50° C. and 600° C., and wherein the solid electrolyte permits conduction or migration of oxygen ions through the solid electrolyte for participation in redox reactions at the first electrode and the second electrode.

11. The Faradaic solid-state energy storage device of claim 1, further comprising:
    a second solid electrolyte positioned in direct contact with the second electrode,
        wherein the second solid electrolyte has a fourth thickness greater than 1 nm and less than or equal to 500 nm, and
        wherein the second solid electrolyte comprises a second solid-state, oxygen ion conducting ceramic electrolyte, wherein the second solid-state, oxygen ion conducting ceramic electrolyte has the crystal structure including vacancies that permit conduction or migration of oxygen ions through the crystal structure; and a third electrode positioned in direct contact with the second solid electrolyte,
wherein the third electrode has a fifth thickness greater than 1 nm and less than or equal to 80 nm, and
wherein the third electrode comprises a third redox-supporting transition metal, an oxide of the third redox-supporting transition metal, or a combination of the third redox-supporting transition metal and the oxide of the third redox-supporting transition metal.

12. The Faradaic solid-state energy storage device of claim 1, wherein the first redox-supporting transition metal comprises manganese, wherein the second redox-supporting transition metal comprises manganese, or wherein both the first redox-supporting transition metal and the second redox-supporting transition metal comprise manganese.

13. The Faradaic solid-state energy storage device of claim 1, wherein the first electrode has a first oxidation state and the second electrode has a second oxidation state, and wherien a difference between the first oxidation state and the second oxidation state provides a stored electrical energy density of between 10 J/cm$^3$ and 750 J/cm$^3$.

14. The Faradaic solid-state energy storage device of claim 1, wherein the solid-state, oxygen ion conducting ceramic comprises yttria-stabilized zirconia (YSZ) having the crystal structure including vacancies that permit conduction or migration of oxygen ions through the crystal structure.

15. A method of making a Faradaic solid-state energy storage device, the method comprising:
depositing a first electrode on a substrate,
wherein the first electrode has a first thickness greater than 1 nm and less than or equal to 80 nm,
wherein the first electrode comprises a first redox-supporting transition metal, an oxide of the first redox-supporting transition metal, or a combination of the first redox-supporting transition metal and the oxide of the first redox-supporting transition metal, and
wherein depositing the first electrode includes depositing using a first controllable deposition method;
depositing a solid electrolyte on the first electrode,
wherein the solid electrolyte has a second thickness greater than 1 nm and less than or equal to 500 nm,
wherein the solid electrolyte comprises a solid-state, oxygen ion conducting ceramic electrolyte, wherein the solid-state, oxygen ion conducting ceramic has a crystal structure including vacancies that permit conduction or migration of oxygen ions through the crystal structure, and
wherein depositing the solid electrolyte includes depositing using a second controllable deposition method; and
depositing a second electrode on the solid electrolyte,
wherein the second electrode has a third thickness greater than 1 nm and less than or equal to 80 nm,
wherein the second electrode comprises a second redox-supporting transition metal, an oxide of the second redox-supporting transition metal, or a combination of the second redox-supporting transition metal and the oxide of the second redox-supporting transition metal, and
wherein depositing the second electrode includes depositing using a third controllable deposition method.

16. The method of claim 15, further comprising:
depositing a second solid electrolyte on the second electrode,
wherein the second solid electrolyte has a fourth thickness greater than 1 nm and less than or equal to 500 nm,
wherein the second solid electrolyte comprises a second solid-state, oxygen ion conducting ceramic electrolyte, wherein the second solid-state, oxygen ion conducting ceramic electrolyte has a crystal structure including vacancies that permit conduction or migration of oxygen ions through the crystal structure, and
wherein depositing the second solid electrolyte includes depositing using a fourth controllable deposition method; and
depositing a third electrode on the second solid electrolyte,
wherein the third electrode has a fifth thickness greater than 1 nm and less than or equal to 80 nm,
wherein the third electrode comprises a third redox-supporting transition metal, an oxide of the third redox-supporting transition metal, or a combination of the third redox-supporting transition metal and the oxide of the third redox-supporting transition metal, and
wherein depositing the third electrode includes depositing using a fifth controllable deposition method.

17. The method of claim 15, wherein the first redox-supporting transition metal and the second redox-supporting transition metal independently comprise ruthenium, manganese, cobalt, or nickel, and wherein the solid-state, oxygen ion conducting ceramic electrolyte comprises yttria-stabilized zirconium (YSZ) having the crystal structure including vacancies that permit conduction or migration of oxygen ions through the crystal structure.

18. The method of claim 15, further comprising initiating redox reactions at the first electrode and the second electode to reversibly establish stored electrical energy having a density of between 10 J/cm$^3$ and 750 J/cm$^3$.

19. A Faradaic solid-state energy storage device comprising:
a first electrode,
wherein the first electrode has a first thickness greater than 1 nm and less than or equal to 80nm, and
wherein the first electrode comprises a cobalt oxide or a nickel oxide;
a solid electrolyte positioned in direct contact with the first electrode,
wherein the solid electrolyte has a second thickness greater than 1 nm and less than or equal to 500 nm, and
wherein the solid electrolyte comprises a solid-state, oxygen ion conducting yttrium stabilized zirconium (YSZ) electrolyte, wherein the solid-state, oxygen ion conducting YSZ electrolyte has a crystal structure including vacancies that permit conduction or migration of oxygen ions through the YSZ;
a second electrode positioned in direct contact with the solid electrolyte,
wherein the second electrode has a third thickness greater than 1 nm and less than or equal to 80nm, and
wherein the second electrode comprises cobalt oxide or nickel oxide;
a plurality of additional solid electrolytes, each of the plurality of additional solid electrolytes positioned in direct contact with one or two electrodes, wherein the plurality of additional solid electrolytes each independently have thicknesses greater than 1 nm and less than or equal to 500 nm, and wherein the plurality of additional solid electrolytes comprise the solid-state, oxygen ion conducting ceramic electrolyte; and a plurality of additional electrodes, each of the plurality of additional electrodes positioned in direct contact with one or two of the plurality of additional solid electrolytes, wherein the plurality of additional electrodes each independently have thicknesses greater than 1 nm and less than or equal to 80 nm, and wherein the plurality of additional electrodes each independently comprise cobalt oxide or nickel oxide.

20. The Faradaic solid-state energy storage device of claim 19, wherein oxidation states of the cobalt oxide or the nickel oxide alternate from electrode to electrode.

* * * * *